United States Patent
Tanigawa

(10) Patent No.: US 8,527,235 B2
(45) Date of Patent: Sep. 3, 2013

(54) OBJECT POSITION ESTIMATION SYSTEM, OBJECT POSITION ESTIMATION DEVICE, OBJECT POSITION ESTIMATION METHOD AND OBJECT POSITION ESTIMATION PROGRAM

(75) Inventor: Toru Tanigawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 468 days.

(21) Appl. No.: 12/933,888

(22) PCT Filed: Feb. 18, 2010

(86) PCT No.: PCT/JP2010/001038
§ 371 (c)(1),
(2), (4) Date: Sep. 22, 2010

(87) PCT Pub. No.: WO2010/095437
PCT Pub. Date: Aug. 26, 2010

(65) Prior Publication Data
US 2011/0029278 A1 Feb. 3, 2011

(30) Foreign Application Priority Data
Feb. 19, 2009 (JP) .................. 2009-036202

(51) Int. Cl.
*G01C 9/00* (2006.01)
(52) U.S. Cl.
USPC ............ 702/150; 702/176; 702/179; 702/189
(58) Field of Classification Search
USPC .................. 702/150, 176, 179, 189; 382/103, 382/181, 276
See application file for complete search history.

(56) References Cited

U.S. PATENT DOCUMENTS

| 6,061,644 | A | 5/2000 | Leis | |
|---|---|---|---|---|
| 7,035,764 | B2 * | 4/2006 | Rui et al. | 702/179 |
| 8,099,427 | B2 | 1/2012 | Tanigawa et al. | |
| 2007/0225933 | A1 * | 9/2007 | Shimomura | 702/127 |
| 2009/0066513 | A1 | 3/2009 | Kondo et al. | |

FOREIGN PATENT DOCUMENTS

| CN | 1199054 | 4/2005 |
|---|---|---|
| CN | 101052982 | 10/2007 |
| JP | 2005-031955 | 2/2005 |

(Continued)

OTHER PUBLICATIONS

International Search Report issued Mar. 16, 2010 in International (PCT) Application No. PCT/JP2010/001038.

(Continued)

*Primary Examiner* — Sujoy Kundu
*Assistant Examiner* — Elias Desta
(74) *Attorney, Agent, or Firm* — Wenderoth, Lind & Ponack, L.L.P.

(57) ABSTRACT

ID likelihoods and position likelihoods of an object are detected by a first observation device, and position likelihoods of the object and tracking states of the object are detected by a second observation device; thus, the object detected by the second observation device and the object ID are associated with each other by an association unit, and based upon information from the second observation device and the association unit, the ID likelihoods of the object detected by the second observation device are determined by a second object ID likelihood determination unit so that the object position is estimated by an object position estimation unit based upon the ID likelihoods and position likelihoods.

8 Claims, 18 Drawing Sheets

(56) References Cited

FOREIGN PATENT DOCUMENTS

| | | |
|---|---|---|
| JP | 2005-141687 | 6/2005 |
| JP | 2005-165421 | 6/2005 |
| JP | 2006-123161 | 5/2006 |
| JP | 2006-270456 | 10/2006 |
| JP | 2008-008684 | 1/2008 |
| JP | 2008-275324 | 11/2008 |
| WO | 2007/074671 | 7/2007 |

OTHER PUBLICATIONS

Y. Shirasaka, "RFID ni yoru Gazo Shikibetsu Learning Model Parameters of Object Image Classification Using RFID," Annual Conference of JSAI Ronbunshu (CD-ROM), 2007, vol. 21, No. 3D7-2, pp. 1-4.

H. Kanazaki et al., "Variational Approximation Data Association Filter," 15$^{th}$ European Signal Processing Conference, issued Sep. 2007, pp. 1872-1876.

International Preliminary Report on Patentability and Written Opinion of the International Searching Authority (in English), issued Sep. 13, 2011 in International Application PCT/JP2010/001038.

Chinese Office Action issued Nov. 21, 2012 (with English translation) in a Chinese application that is a foreign counterpart to the present application.

* cited by examiner

Fig.4

| PERSON ID | TAG ID |
|---|---|
| H1 | T4 |
| H2 | T7 |
| H3 | T8 |

Fig.5

| OBSERVATION ID | TIME | POSITION (x,y) | TAG ID |
|---|---|---|---|
| OBS_TAG_001 | 2008/09/02_12:00:00 | (150,210) | T4 |
| OBS_TAG_002 | 2008/09/02_12:00:00 | (620,100) | T7 |
| OBS_TAG_003 | 2008/09/02_12:00:00 | (820,630) | T8 |
| OBS_TAG_004 | 2008/09/02_12:00:01 | (300,210) | T4 |
| OBS_TAG_005 | 2008/09/02_12:00:01 | (530,190) | T7 |
| OBS_TAG_006 | 2008/09/02_12:00:01 | (780,690) | T8 |
| OBS_TAG_007 | 2008/09/02_12:00:02 | (420,570) | T4 |
| OBS_TAG_008 | 2008/09/02_12:00:02 | (500,230) | T7 |
| OBS_TAG_009 | 2008/09/02_12:00:02 | (530,430) | T8 |

Fig. 6

| OBSERVATION ID | TIME | POSITION (x,y) | AMOUNT OF COLOR FEATURE |
|---|---|---|---|
| OBS_CAM_001 | 2008/09/02_12:00:00 | (150,410) | RED |
| OBS_CAM_002 | 2008/09/02_12:00:00 | (810,220) | WHITE |
| OBS_CAM_003 | 2008/09/02_12:00:00 | (810,640) | GREEN |
| OBS_CAM_004 | 2008/09/02_12:00:01 | (320,390) | RED |
| OBS_CAM_005 | 2008/09/02_12:00:01 | (700,220) | WHITE |
| OBS_CAM_006 | 2008/09/02_12:00:01 | (660,520) | GREEN |
| OBS_CAM_007 | 2008/09/02_12:00:02 | (440,390) | RED |
| OBS_CAM_008 | 2008/09/02_12:00:02 | (580,380) | WHITE |
| OBS_CAM_009 | 2008/09/02_12:00:02 | (590,460) | GREEN |

Fig.7

| PERSON ID | TIME | POSITION (x,y) |
|---|---|---|
| H1 | 2008/09/02_12:00:00 | (230,380) |
| H2 | 2008/09/02_12:00:00 | (620,260) |
| H3 | 2008/09/02_12:00:00 | (720,610) |
| H1 | 2008/09/02_12:00:01 | (340,340) |
| H2 | 2008/09/02_12:00:01 | (620,220) |
| H3 | 2008/09/02_12:00:01 | (650,600) |
| H1 | 2008/09/02_12:00:02 | (410,390) |
| H2 | 2008/09/02_12:00:02 | (500,350) |
| H3 | 2008/09/02_12:00:02 | (530,420) |

Fig.8

| OBSERVATION ID | HUM_001 | HUM_002 | HUM_003 |
|---|---|---|---|
| OBS_CAM_001 | 0.4 | 0.3 | 0.3 |
| OBS_CAM_002 | 0.3 | 0.3 | 0.4 |
| OBS_CAM_003 | 0.3 | 0.4 | 0.3 |
| OBS_CAM_004 | 0.69 | 0.19 | 0.12 |
| OBS_CAM_005 | 0.12 | 0.69 | 0.19 |
| OBS_CAM_006 | 0.14 | 0.29 | 0.57 |
| OBS_CAM_007 | 0.85 | 0.1 | 0.05 |
| OBS_CAM_008 | 0.1 | 0.76 | 0.14 |
| OBS_CAM_009 | 0.1 | 0.21 | 0.69 |

Fig.18

| TIME | OBSERVATION ID |
|---|---|
| 12:00:00:000 (REFERENCE TIME) | |
| 12:00:00:059 | OBS_CAM_201 |
| 12:00:00:063 | OBS_TAG_201 |
| 12:00:01:000 (REFERENCE TIME) | |
| 12:00:01:079 | OBS_CAM_202 |
| 12:00:01:091 | OBS_TAG_202 |
| 12:00:02:000 (REFERENCE TIME) | |
| 12:00:02:057 | OBS_CAM_203 |
| 12:00:02:085 | OBS_TAG_203 |
| 12:00:03:000 (REFERENCE TIME) | |

Fig.19A

| ENTRANCE | (100,0) |
|---|---|

Fig.19B

| CAMERA BLIND SPOT 1 | (100,100),(200,200) |
|---|---|
| CAMERA BLIND SPOT 2 | (400,100),(600,100) |
| CAMERA BLIND SPOT 3 | (600,400),(700,600) |

OBJECT POSITION ESTIMATION SYSTEM, OBJECT POSITION ESTIMATION DEVICE, OBJECT POSITION ESTIMATION METHOD AND OBJECT POSITION ESTIMATION PROGRAM

TECHNICAL FIELD

The present invention relates to an object position estimation system that identifies an object and estimates its position based upon pieces of information of a plurality of different kinds of sensors (observation devices), and also concerns an object position estimation device, an object position estimation method and an object position estimation program.

BACKGROUND ART

Radio tags or cameras are often used as sensors capable of detecting positions of objects.

Although the radio tags basically never fail to identify the ID of an object (because the ID identification of an object is carried out based upon ID information transmitted by a transmission tag attached to the object to be identified), their position measuring precision is not good in comparison with that of the camera. Moreover, for example, another issue arises in which, since radio waves are absorbed by moisture, the detection of the tag becomes instable. For this reason, under a general environment in which, different from a factory or the like, the environment is not properly prepared, the position measuring precision of the radio tag is not expected so much. In particular, for example, when a person or the like containing much moisture is carrying a radio tag, the positional error might become 1 m or more, or the tag itself might not be detected.

Moreover, in the case of the camera, its position measuring precision is better than that of the radio tag, when the detection of an object is appropriately carried out; however, the object ID identification precision cannot be set to 100% (because the object ID is identified based upon image-based features obtained by the camera (shape, color, or the like)). In particular, the identification rates of objects having similar image-based features become lower. For example, it is very difficult to identify objects having similar colors or shapes, such as a tomato, an apple, and the like, with high precision.

In this manner, since degrees of detection performances are different depending on the respective kinds of sensors, it is difficult to identify an object and also to determine its position by using only one kind of a sensor. Therefore, a technique has been proposed in which a plurality of kinds of sensors are combined with one another, and by integrating pieces of observation information of the plurality of sensors of different kinds, the position of an object is estimated while compensating for their insufficiencies in observation precision of the sensors of the respective kinds (Non-Patent Document 1).

PRIOR ART DOCUMENTS

Non-Patent Documents

Non-Patent Document 1: Hirofumi Kanazaki, Takehisa Yairi, Kazuo Machida, Kenji Kondo, and Yoshihiko Matsukawa, "Variational Approximation Data Association Filter", 15$^{th}$ European Signal Processing Conference (EUSIPC02007), Publication Date: Sep. 3, 2007, p 1872-p 1876.

SUMMARY OF INVENTION

Issues to be Solved by the Invention

However, in order to use the above-mentioned technique for estimating the object position, it is the premise that all the observation devices can identify the ID of an object. However, in the case when tracking processes of the position of an object or a person in an actual environment are taken into consideration, there are some cases in which the premise that the ID identification is available in all the observation devices is not satisfied.

For example, in the case when an identifying process of a person is carried out by using a camera as the observation device, it is easily assumed that there is a state in which a person is wearing different closes every day or a state in which a plurality of persons are wearing the same uniforms. In such a case, it is difficult to identify persons based upon the amount of feature of the colors of the clothes obtained by the camera in an actual state. Alternatively, even in the case when the amount of feature of a face image is used for identifying persons, since the person does not necessarily walk with his or her face always facing in the camera direction, it is not possible to ensure the stable identifying process of the persons. A system may be proposed in which a plurality of cameras are arranged all over the place; however, such a system structure and a system installation cause extremely high costs, making it difficult to put it into practical use from the view point of the cost-benefit ratio.

On the other hand, with respect to the ID identification of articles that hardly cause changes in features of the colors or the shapes, although it is stably carried out by using the camera, conditions that satisfy such a premise are extremely limited, to cause a bottle neck in practical use.

As described above, the technique disclosed in the prior art (non-patent document 1) has an issue in that, when an observation device that fails to carry out an ID identification is included, the position estimation of an object cannot be carried out. At the same time, another issue is that a state in which the prerequisite of the prior art is satisfied is extremely limited with the result that its application range is very narrow.

In view of these circumstances, the objective of the present invention is to provide an object position estimation system which can estimate a position of an object even when an observation device incapable of object ID identification, typically represented by a camera, is included therein, as well as an object position estimation device, an object estimation method, and an object position estimation program. More specifically, the present invention calculates a numeric value corresponding to the ID likelihood of an object observed by an observation device incapable of ID identification, based upon observation information given those observation devices other than the observation device incapable of ID identification, so that the conventional issues can be solved.

Means for Solving the Issues

In order to achieve the above-mentioned object, the present invention has the following structures:

According to a first aspect of the present invention, there is provided an object position estimation system, which estimates a position of an object, characterized by comprising:

a first observation unit that observes the object at respectively different points of time so that pieces of first observation information including positions and IDs of the object is acquired;

a first object position likelihood determination unit that, based upon the pieces of first observation information respectively observed in the first observation unit, determines first object position likelihoods corresponding to estimated positions of the object at each of the respective points of time;

a first object ID likelihood determination unit that, based upon the first object position likelihood determined by the first object position likelihood determination unit, determines first object ID likelihoods of the object at the respective points of time;

a second observation unit that observes the object at respectively different points of time to respectively acquire pieces of second observation information including positions and amounts of feature of the object and attaches second observation IDs to the pieces of second observation information;

a second object position likelihood determination unit that, based upon the pieces of the second observation information respectively observed in the second observation unit, determines second object position likelihoods corresponding to estimated positions of the object at the respective points of time;

an object tracking state determination unit that detects two pieces of the second observation information having a same amount of feature of the object, obtained at different points of time, and determines, by making the second observation IDs of the two pieces of the second observation information thus detected mutually associated with each other, tracking state information of the object;

a second object ID likelihood determination unit that, based upon the tracking state information of the object and the estimated positions of the object, determines second object ID likelihoods of the second observation information;

an association unit that, based upon the first object ID likelihoods and the first object position likelihoods of the object, calculates a first object association value, and based upon the second object ID likelihoods and the second object position likelihoods, also calculates a second object association value; and an object position estimation unit that, based upon the first object ID likelihoods, the first object position likelihoods, and the first object association value of the object and/or the second object ID likelihoods, the second object position likelihoods, and the second object association value of the object, estimates the position of the object.

According to a sixth aspect of the present invention, there is provided an object position estimation method, which estimates a position of an object, characterized by comprising:

observing the object at respectively different points of time so that pieces of first observation information including positions and IDs of the object is acquired by a first observation unit;

based upon the pieces of first observation information respectively observed in the first observation unit, determining first object position likelihoods corresponding to estimated positions of the object at each of the respective points of time by using a first object position likelihood determination unit;

based upon the first object position likelihoods determined by the first object position likelihood determination unit, determining first object ID likelihoods of the object at the respective points of time by using a first object ID likelihood determination unit;

observing the object at respectively different points of time to respectively acquire pieces of second observation information including the positions and amounts of feature of the object by using a second observation unit and attaching second observation IDs to the pieces of second observation information by using the second observation unit;

based upon the pieces of the second observation information respectively observed in the second observation unit, determining second object position likelihoods corresponding to estimated positions of the object at the respective points of time by using a second object position likelihood determination unit;

detecting two pieces of the second observation information having a same amount of feature of the object, obtained at different points of time, and determining, by making the second observation IDs of the two pieces of the second observation information thus detected mutually associated with each other, tracking state information of the object by an object tracking state determination unit;

based upon the tracking state information of the object and the estimated positions of the object, determining second object ID likelihoods of the second observation information by using a second object ID likelihood determination unit;

based upon the first object ID likelihoods and the first object position likelihoods of the object, calculating a first object association value by using an association unit;

based upon the second object ID likelihoods and the second object position likelihoods of the object, also calculating a second object association value by using the association unit; and based upon the first object ID likelihoods, the first object position likelihoods, and the first object association value of the object and/or the second object ID likelihoods, the second object position likelihoods, and the second object association value of the object, estimating the position of the object by using an object position estimation unit.

According to a seventh aspect of the present invention, there is provided an object position estimation program, which allows a computer to carry out functions of:

observing the object at respectively different points of time so that pieces of first observation information including positions and IDs of the object is acquired by a first observation unit;

based upon the pieces of first observation information respectively observed in the first observation unit, determining first object position likelihoods corresponding to estimated positions of the object at the respective points of time by using a first object position likelihood determination unit;

based upon the first object position likelihoods determined by the first object position likelihood determination unit, determining first object ID likelihoods of the object at the respective points of time by using a first object ID likelihood determination unit;

observing the object at respectively different points of time to respectively acquire pieces of second observation information including the positions and amounts of feature of the object by using a second observation unit and attaching second observation IDs to the pieces of second observation information by using the second observation unit;

based upon the pieces of the second observation information respectively observed in the second observation unit, determining second object position likelihoods corresponding to estimated positions of the object at the respective points of time by using a second object position likelihood determination unit;

detecting two pieces of the second observation information having a same amount of feature of the object, obtained at different points of time, and determining, by making the second observation IDs of the two pieces of the second observation information thus detected mutually associated with each other, tracking state information of the object by an object tracking state determination unit;

based upon the tracking state information of the object and the estimated positions of the object, determining second object ID likelihoods of the second observation information by using a second object ID likelihood determination unit;

based upon the first object ID likelihoods and the first object position likelihoods of the object, calculating a first object association value by using an association unit;

based upon the second object ID likelihoods and the second object position likelihoods, calculating a second object association value by using the association unit; and based upon the first object ID likelihoods, the first object position likelihoods, and the first object association value of the object and/or the second object ID likelihoods, the second object position likelihoods, and the second object association value of the object, estimating the position of the object by using an object position estimation unit.

According to an eighth aspect of the present invention, there is provided an object position estimation device comprising:

a first object position likelihood determination unit that, based upon pieces of first observation information from a first observation unit that observes an object at respectively different points of time to acquire the pieces of first observation information including positions and IDs of the object, determines first object position likelihoods corresponding to estimated positions of the object at the respective points of time;

a first object ID likelihood determination unit that, based upon the first object position likelihood determined by the first object position likelihood determination unit, determines first object ID likelihoods of the object at the respective points of time;

a second object position likelihood determination unit that, based upon pieces of second observation information from a second observation unit that observes an object at respectively different points of time to acquire the pieces of second observation information including the positions and amounts of feature of the object and to attach second observation IDs to the pieces second observation information, determines second object position likelihoods corresponding to estimated positions of the object at the respective points of time;

an object tracking state determination unit that detects two pieces of the second observation information having a same amount of feature of the object, obtained at different points of time, and determines, by making the second observation IDs of the two pieces of the second observation information thus detected mutually associated with each other, tracking state information of the object;

a second object ID likelihood determination unit that, based upon the tracking state information of the object and the estimated positions of the object, determines second object ID likelihoods of the second observation information;

an association unit that, based upon the first object ID likelihoods and the first object position likelihoods of the object, calculates a first object association value, and based upon the second object ID likelihoods and the second object position likelihoods, also calculates a second object association value; and an object position estimation unit that, based upon at least either one of the groups including (1) the first object ID likelihoods, the first object position likelihoods, and the first object association value of the object, and (2) the second object ID likelihoods, the second object position likelihoods, and the second object association value of the object, estimates the position of the object.

In accordance with the present structure, the amount corresponding to the ID likelihood of an object observed by the second observation device can be calculated based upon observation information of the first observation device capable of ID identification, so that, even when an ID identifying function of an object is not provided in the second observation device, it becomes possible to estimate the position of an object.

Effects of the Invention

In accordance with the object position estimation system, object position estimation device, object position estimation method, and object position estimation program of the present invention, ID likelihood of an object can be determined based upon information from those observation devices other than the observation device incapable of ID identification. For this reason, even when an observation device is not provided with an ID identifying function of an object, it is possible to estimate the position of the object.

BRIEF DESCRIPTION OF DRAWINGS

These and other aspects and features of the present invention will become clear from the following description taken in conjunction with the preferred embodiments thereof with reference to the accompanying drawings, in which:

FIG. 4 is a drawing that shows an example of a person ID conversion table in the object position estimation system in accordance with the first embodiment of the present invention;

FIG. 5 is a drawing that shows an example of an output history of a first observation device of the object position estimation system in accordance with the first embodiment of the present invention;

FIG. 6 is a drawing that shows an example of an output history of a second observation device of the object position estimation system in accordance with the first embodiment of the present invention;

FIG. 7 is a drawing that shows an example of an output history of an object position estimation means of the object position estimation system in accordance with the first embodiment of the present invention;

FIG. 8 is a drawing that shows an example of an output history of a second object ID likelihood determination means of the object position estimation system in accordance with the first embodiment of the present invention;

FIG. 18 is a drawing that shows a setting of reference time in the object position estimation system in accordance with the first embodiment of the present invention;

FIG. 19A is a drawing that shows one example of an environment map (environment map information) provided in the object position estimation system in accordance with the first embodiment of the present invention; and FIG. 19B is a drawing that shows one example of an environment map provided in the camera in the object position estimation system in accordance with the first embodiment of the present invention.

DESCRIPTION OF EMBODIMENTS

Figure 1A:
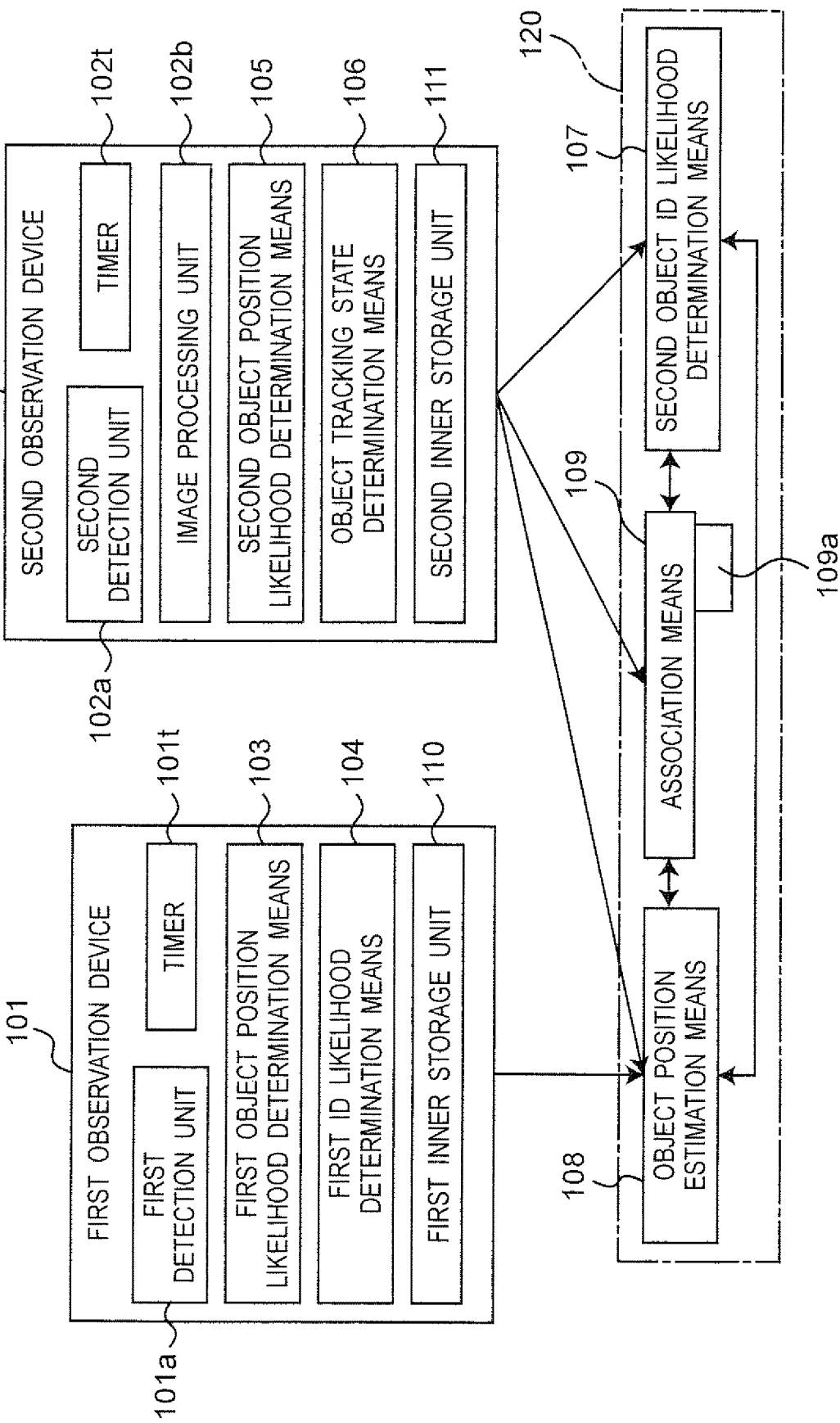
FIG. 1A is a block diagram that shows a structure of an object position estimation system in accordance with a first embodiment of the present invention.

Referring to Figs., the following description will discuss embodiments of the present invention.

Prior to the detailed explanation of the embodiments of the present invention by reference to Figs., various modes of the present invention will be explained.

According to a first aspect of the present invention, there is provided an object position estimation system, which estimates a position of an object, characterized by comprising:

a first observation unit that observes the object at respectively different points of time so that pieces of first observation information including positions and IDs of the object is acquired;

a first object position likelihood determination unit that, based upon the pieces of first observation information respectively observed in the first observation unit, determines first object position likelihoods corresponding to estimated positions of the object at each of the respective points of time;

a first object ID likelihood determination unit that, based upon the first object position likelihood determined by the first object position likelihood determination unit, determines first object ID likelihoods of the object at the respective points of time;

a second observation unit that observes the object at respectively different points of time to respectively acquire pieces of second observation information including positions and amounts of feature of the object and attaches second observation IDs to the pieces of second observation information;

a second object position likelihood determination unit that, based upon the pieces of the second observation information respectively observed in the second observation unit, determines second object position likelihoods corresponding to estimated positions of the object at the respective points of time;

an object tracking state determination unit that detects two pieces of the second observation information having a same amount of feature of the object, obtained at different points of time, and determines, by making the second observation IDs of the two pieces of the second observation information thus detected mutually associated with each other, tracking state information of the object;

a second object ID likelihood determination unit that, based upon the tracking state information of the object and the estimated positions of the object, determines second object ID likelihoods of the second observation information;

an association unit that, based upon the first object ID likelihoods and the first object position likelihoods of the object, calculates a first object association value, and based upon the second object ID likelihoods and the second object position likelihoods, also calculates a second object association value; and an object position estimation unit that, based upon the first object ID likelihoods, the first object position likelihoods, and the first object association value of the object and/or the second object ID likelihoods, the second object position likelihoods, and the second object association value of the object, estimates the position of the object.

According to a second aspect of the present invention, there is provided the object position estimation system according to the first aspect, characterized in that the object tracking state determination unit outputs a tracking success likelihood that indicates a probability of successful tracking of the object and a tracking failure likelihood that indicates a probability of failure in tracking the object, and the second object ID likelihood determination unit provides a sum of a value obtained by multiplying the association value calculated upon a previous detection of the object by the tracking success likelihood and a value obtained by dividing the tracking failure likelihood by a number of all the objects serving as detection subjects, as the second ID likelihood of the object.

According to a third aspect of the present invention, there is provided The object position estimation system according to the first or second aspect, characterized in that in a case when by detecting two pieces of the second observation information having a same amount of feature, obtained at different points of time, the object tracking state determination unit determines that the object detected by the second observation device is being tracked, the association unit finds the ID of the object detected by the second observation device, based upon the ID of the object and the position of the object estimated by the object position estimation unit.

According to a fourth aspect of the present invention, there is provided the object position estimation system according to any one of the first to third aspects, characterized by further comprising:

an environment map in which entrance information including a position of an entrance through which the persons that are present in the environment get in or get out, or blind spot information of the first observation device, or blind spot information of the second observation device is recorded.

According to a fifth aspect of the present invention, there is provided the object position estimation system according to any one of the first to fourth aspects, characterized in that the object tracking state determination unit determines probability of detecting a plurality of overlapped objects as a single object.

According to a sixth aspect of the present invention, there is provided an object position estimation method, which estimates a position of an object, characterized by comprising:

observing the object at respectively different points of time so that pieces of first observation information including positions and IDs of the object is acquired by a first observation unit;

based upon the pieces of first observation information respectively observed in the first observation unit, determining first object position likelihoods corresponding to estimated positions of the object at each of the respective points of time by using a first object position likelihood determination unit;

based upon the first object position likelihoods determined by the first object position likelihood determination unit, determining first object ID likelihoods of the object at the respective points of time by using a first object ID likelihood determination unit;

observing the object at respectively different points of time to respectively acquire pieces of second observation information including the positions and amounts of feature of the object by using a second observation unit and attaching second observation IDs to the pieces of second observation information by using the second observation unit;

based upon the pieces of the second observation information respectively observed in the second observation unit, determining second object position likelihoods corresponding to estimated positions of the object at the respective points of time by using a second object position likelihood determination unit;

detecting two pieces of the second observation information having a same amount of feature of the object, obtained at different points of time, and determining, by making the second observation IDs of the two pieces of the second observation information thus detected mutually associated with each other, tracking state information of the object by an object tracking state determination unit;

based upon the tracking state information of the object and the estimated positions of the object, determining second object ID likelihoods of the second observation information by using a second object ID likelihood determination unit;

based upon the first object ID likelihoods and the first object position likelihoods of the object, calculating a first object association value by using an association unit;

based upon the second object ID likelihoods and the second object position likelihoods of the object, also calculating a second object association value by using the association unit; and based upon the first object ID likelihoods, the first object position likelihoods, and the first object association value of the object and/or the second object ID likelihoods, the second object position likelihoods, and the second object association value of the object, estimating the position of the object by using an object position estimation unit.

According to a seventh aspect of the present invention, there is provided an object position estimation program, which allows a computer to carry out functions of:

observing the object at respectively different points of time so that pieces of first observation information including positions and IDs of the object is acquired by a first observation unit;

based upon the pieces of first observation information respectively observed in the first observation unit, determining first object position likelihoods corresponding to estimated positions of the object at the respective points of time by using a first object position likelihood determination unit;

based upon the first object position likelihoods determined by the first object position likelihood determination unit, determining first object ID likelihoods of the object at the respective points of time by using a first object ID likelihood determination unit;

observing the object at respectively different points of time to respectively acquire pieces of second observation information including the positions and amounts of feature of the object by using a second observation unit and attaching second observation IDs to the pieces of second observation information by using the second observation unit;

based upon the pieces of the second observation information respectively observed in the second observation unit, determining second object position likelihoods corresponding to estimated positions of the object at the respective points of time by using a second object position likelihood determination unit;

detecting two pieces of the second observation information having a same amount of feature of the object, obtained at different points of time, and determining, by making the second observation IDs of the two pieces of the second observation information thus detected mutually associated with each other, tracking state information of the object by an object tracking state determination unit;

based upon the tracking state information of the object and the estimated positions of the object, determining second object ID likelihoods of the second observation information by using a second object ID likelihood determination unit;

based upon the first object ID likelihoods and the first object position likelihoods of the object, calculating a first object association value by using an association unit;

based upon the second object ID likelihoods and the second object position likelihoods, calculating a second object association value by using the association unit; and based upon the first object ID likelihoods, the first object position likelihoods, and the first object association value of the object and/or the second object ID likelihoods, the second object position likelihoods, and the second object association value of the object, estimating the position of the object by using an object position estimation unit.

According to an eighth aspect of the present invention, there is provided an object position estimation device comprising:

a first object position likelihood determination unit that, based upon pieces of first observation information from a first observation unit that observes an object at respectively different points of time to acquire the pieces of first observation information including positions and IDs of the object, determines first object position likelihoods corresponding to estimated positions of the object at the respective points of time;

a first object ID likelihood determination unit that, based upon the first object position likelihood determined by the first object position likelihood determination unit, determines first object ID likelihoods of the object at the respective points of time;

a second object position likelihood determination unit that, based upon pieces of second observation information from a second observation unit that observes an object at respectively different points of time to acquire the pieces of second observation information including the positions and amounts of feature of the object and to attach second observation IDs to the pieces second observation information, determines second object position likelihoods corresponding to estimated positions of the object at the respective points of time;

an object tracking state determination unit that detects two pieces of the second observation information having a same amount of feature of the object, obtained at different points of time, and determines, by making the second observation IDs of the two pieces of the second observation information thus detected mutually associated with each other, tracking state information of the object;

a second object ID likelihood determination unit that, based upon the tracking state information of the object and the estimated positions of the object, determines second object ID likelihoods of the second observation information;

an association unit that, based upon the first object ID likelihoods and the first object position likelihoods of the object, calculates a first object association value, and based upon the second object ID likelihoods and the second object position likelihoods, also calculates a second object association value; and an object position estimation unit that, based upon at least either one of the groups including (1) the first object ID likelihoods, the first object position likelihoods, and the first object association value of the object, and (2) the second object ID likelihoods, the second object position likelihoods, and the second object association value of the object, estimates the position of the object.

Referring to Figs., the following description will discuss an object position estimation system, an object position estimation device, an object position estimation method that is carried out by such an object position estimation device or an object position estimation system, and an object position estimation program.

First Embodiment

<System Structure>

FIG. 1A is a drawing that shows a structure of an object position estimation system in accordance with a first embodiment of the present invention.

The object position estimation system in accordance with the first embodiment of the present invention is configured by a first observation device 101, a second observation device 102, a second object ID likelihood determination means 107 (second object ID likelihood determination unit), an object position estimation means 108 (object position estimation unit), and an association means 109 (association unit).

The first observation device 101 is provided with a first object position likelihood determination means 103 (first object position likelihood determination unit), a first detection unit 101a functioning as a first observation unit, a first object ID likelihood determination means 104 (first object ID likelihood determination unit), and a first inner storage unit 110. The second observation device 102 is provided with a second detection unit 102a functioning as a second observation unit, an image processing unit 102b, a second object position likelihood determination means 105 (second object position likelihood determination unit), and an object tracking state determination means 106 (object tracking state determination unit), and a second inner storage unit 111.

Figure 1B:
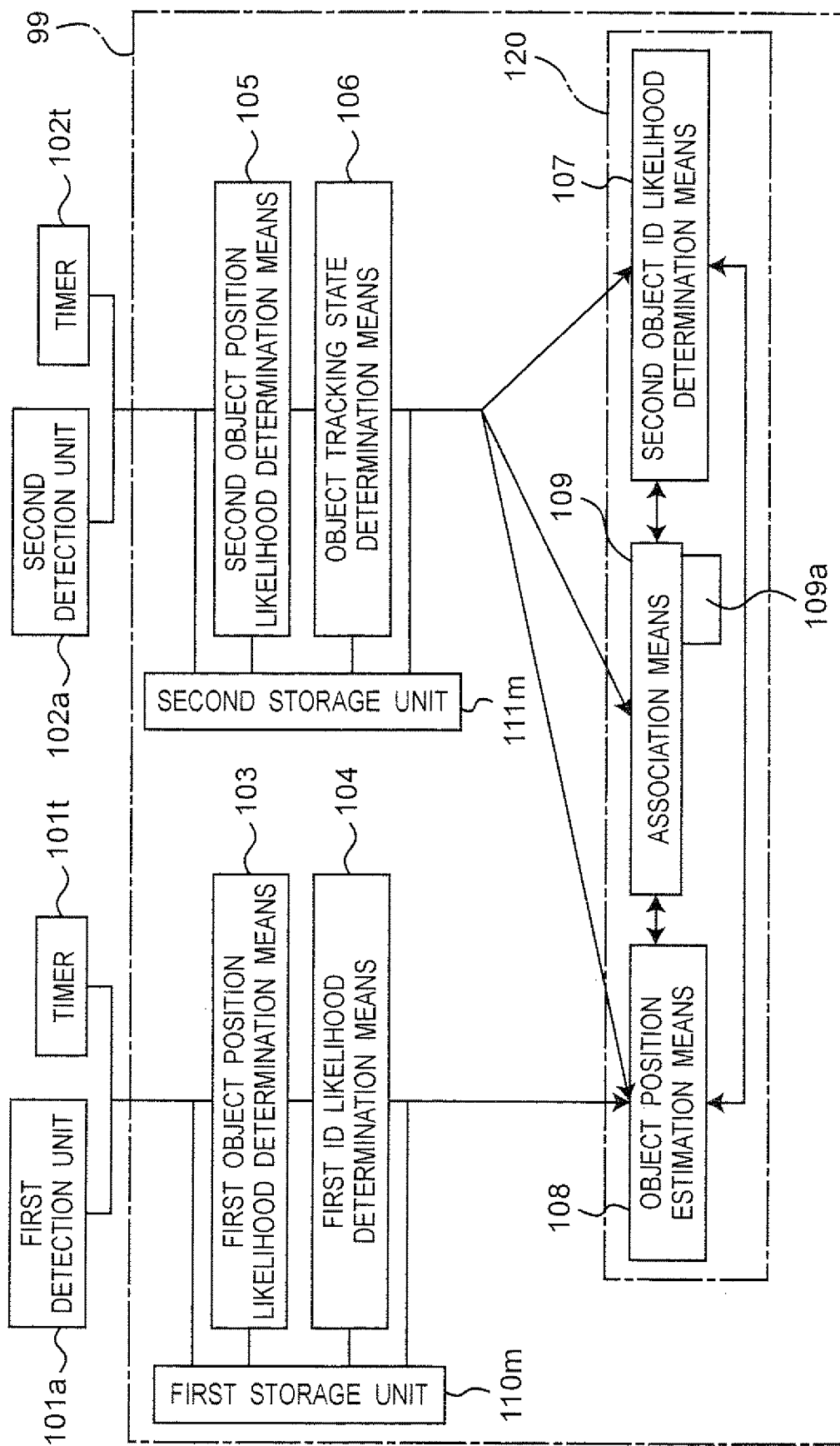
FIG. 1B is a block diagram that shows a structure of an object position estimation device in accordance with a modified example of the first embodiment of the present invention.

Additionally, as a modified example of the object position estimation system in accordance with the first embodiment of the present invention, as shown in FIG. 18, instead of respectively forming the first observation device 101 and the second observation device 102 by using a plurality of components, those components may be individually prepared, and components except for a first detection unit 101a serving as a first observation unit, a first timer 101t, a second detection unit 102a serving as a second observation unit, and a second timer 102t may be prepared as an object position estimation device 99. In other words, in the object position estimation device 99 of FIG. 1B, the first observation device 101 is formed in the same manner as in the object position estimation system relating to the first embodiment shown in FIG. 1A, and an image processing unit 102*b* is added thereto so that a second observation device 102 is formed; thus, the same structure as that of the object estimation system relating to the first embodiment of FIG. 1A may be obtained.

In this case, the object position estimation device 99 is provided with a first object position likelihood determination means 103 (first object position likelihood determination unit), a first object ID likelihood determination means 104 (first object position likelihood determination unit), a second object position likelihood determination means 105 (second object position likelihood determination unit), an object tracking state determination means 106 (object tracking state determination unit), a second object ID likelihood determination means 107 (second object ID likelihood determination unit), an association means 109 (association unit), and an object position estimation means 108 (object position estimation unit), as its main components. As additional components, the object position estimation device 99 may be provided with a first storage unit 110*m* and a second storage unit 111*m*. In this structure, information from the first detection unit 101*a* functioning as the first observation unit and the first timer 101*t* may be inputted to the first object position likelihood determination means 103 (first object position likelihood determination unit), and also stored in the first storage unit 110*m*. Moreover, information from the first object position likelihood determination means 103 (first object position likelihood determination unit) is inputted to the first object ID likelihood determination means 104 (first object ID likelihood determination unit). Furthermore, information from the first object position likelihood determination means 103 (first object position likelihood determination unit) and information from the first object ID likelihood determination means 104 (first object ID likelihood determination unit) may also be stored in the first storage unit 110*m*. The information from the first object ID likelihood determination means 104 (first object ID likelihood determination unit) is inputted to the object position estimation means 108 (object position estimation unit). In the same manner, information from the second detection unit 102*a* functioning as the second observation unit and the second timer 102*t* may be inputted to the second object position likelihood determination means 105 (second object position likelihood determination unit), and also stored in the second storage unit 111*m*. Moreover, information from the second object position likelihood determination means 105 (second object position likelihood determination unit) is inputted to the object tracking state determination means 106 (object tracking state determination unit). Furthermore, information from the second object position likelihood determination means 105 (second object position likelihood determination unit) and information from the object tracking state determination means 106 (object tracking state determination unit) may also be stored in the second storage unit 111*m*. Information from the object tracking state determination means 106 (object tracking state determination unit) is inputted to the object position estimation means 108 (object position estimation unit), the association means 109 (association unit) and the second object ID likelihood determination means 107 (second object ID likelihood determination unit). The object position estimation device 99 of FIG. 1B having this structure is also allowed to exert the same functions and effects as those of the means (units) corresponding to the object position estimation system in accordance with the first embodiment of FIG. 1A.

Figure 3:
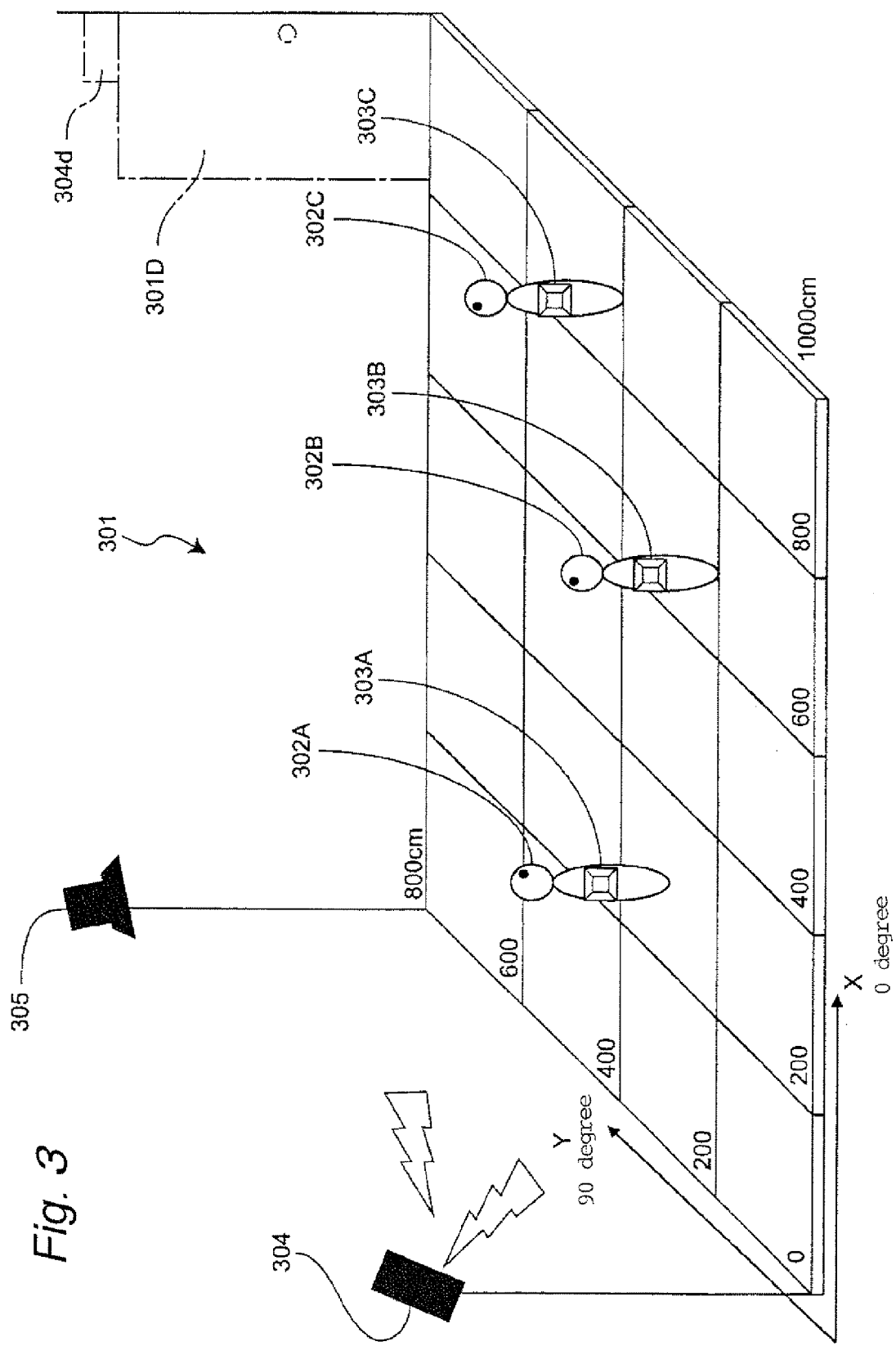
FIG. 3 is an explanatory view that shows a room serving as a life space that is an observation object of the object position estimation system in accordance with the first embodiment of the present invention.

FIG. 3 shows a room 301 serving as a specific example of a life environment that is one example of an environment, which is provided with the first observation device 101 and the second observation device 102 that are components of the object position estimation system in accordance with the first embodiment of the present invention. Onto different corners of a ceiling of the square room 301, tag readers 304 of UWB (Ultra Wide Band) and stereo cameras 305 are respectively attached. Each tag reader 304 functions as one example of the first detection unit 101*a* of the first observation device 101, and each stereo camera 305 functions as one example of the second detection unit 102*a* of the second observation device 102. Suppose that a person 302A having a tag 303A, a person 302B having a tag 303B, and a person 302C having a tag 303C who are respectively detectable by the tag reader 304 are present in the room 301. Hereinafter, a desired person among the person 302A, the person 302B, and the person 302C who are precept in the room 301 is typically explained as a person 302. In the same manner, a desired tag among the tag 303A, the tag 303B, and the tag 303C, located in the room 301, is typically explained as a tag 303.

Referring to FIGS. 1A and 3, the following description will discuss the respective components.

<Explanation of Observation Devices>

Both of the first observation device 101 and the second observation device 102 respectively detect persons 302 who are present in the room 301 that is a specific example of a life environment.

<Explanation of First Observation Device>

The first observation device 101 is provided with the first detection unit 101*a* functioning as a first observation unit, the first object position likelihood determination means 103, the first object ID likelihood determination means 104, and the first inner storage unit 110. The first observation device 101 determines the first ID likelihood (first object ID likelihood) and the first position likelihood (first object position likelihood) of a person 302 who is present in the room 301. Pieces of information of the first ID likelihood and the first position likelihood of the person 302, thus determined, are outputted from the first observation device 101 to the object position estimation means 108.

The ID likelihood, mentioned as the first ID likelihood and the second ID likelihood to be described later, refers to a value of probability as to which object ID a detected object (for example, a person 302 in this case) is likely to have (for example, a person 302 in this case). For example, (in the case of radio tags, IDs can be positively identified as described in the prior art section) in the case when a tag of an object A is detected by using a radio tag, the ID likelihood provides the probability of being the object A as 1, while providing the probability of being another object as 0. In contrast, in the case when an object A is detected by using a camera, it is not possible to positively identify the fact that it corresponds to a specific object. For example, even when an object A is identified by a camera, there is the possibility that an object other than the object A (object B, or object C) might be identified. For this reason, the ID likelihood is assigned to all the objects that are present as rates of probability, such as, for example, the probability of being object A is 0.8, the probability of being object B is 0.1, and the probability of being object C is also 0.1. Additionally, this is one example for determining the ID likelihood, and the present invention is not intended to be limited by this. In the first embodiment of the present invention, the first ID likelihood of the person 302 detected by the first detection unit 101*a* of the first observation device 101 is determined by the first object ID likelihood determination means 104. In contrast, a camera 305, which is one example of the second detection unit 102*a* of the second observation device 102, does not have an ID identifying function for objects. For this reason, by using a second object ID likelihood determination means 107 that is different from the second observation device 102, a second ID likelihood of the person 302 detected by the camera 305 and an image processing unit 102b that serve as a second detection unit 102a of the second observation device 102, is determined.

The position likelihood, mentioned as the first position likelihood and the second position likelihood to be described later, refers to a value of probability as to which object ID a newly observed object is likely to have, with respect to the position of the observed object, based upon positions of respective objects estimated at a certain point of time. For example, suppose that an object A is located at a position 10, an object B is located at a position 20, and an object C is located at a position 40, respectively on one dimensional coordinate. In this case, suppose that an object is detected at a position 0. At this time, the position likelihood can be calculated by getting a reciprocal of a distance from each of estimated positions of the objects A, B, and C, and then carrying out a normalization operation; thus, the probability of being the object A is calculated as 0.58, the probability of being the object B is calculated as 0.28, and the probability of being the object C is calculated as 0.14.

The following description will discuss the object position estimation system at the time of its system activation. In the case when, upon activation of the object position estimation system, the initial estimation position of a person is randomly determined, the tag reader 304 can positively identify the ID of a person. For this reason, it is highly possible that the detected position of a person 302 (by a tag 303 possessed by the person) is closer to the actual position of the person 302 than the (initial) estimated position of the person randomly determined. Therefore, the second position likelihood may be found not based upon the estimated position of the object, but based upon the detected position of the person 302 by the tag reader 304 (using the tag 303 possessed by the person).

Moreover, up to observations of the camera 305 of N-number of times (N is an arbitrary integer greater than 0) from the activation of the object position estimation system, the second position likelihood may be determined based upon the detected position of the person 302 by the tag reader 304 (using the tag 303 possessed by the person), and in observations of the camera 305 after the N-th observation of the camera 305, the second position likelihood may be determined based upon the estimated object position. In this case, the number of times N in which the second position likelihood is determined based upon the detected position of the person 302 by the tag reader 304 (using the tag 303 possessed by the person) becomes different in its optimal value depending on performances of the observation device. For this reason, it is necessary to preliminarily estimate the optimal value by using preliminary experiments or the like. Additionally, this is one example for determining the position likelihood, and the present invention is not intended to by limited by this method. The first position likelihood is determined by the first object position likelihood determination means 103 of the first observation device 101. The second position likelihood is determined by the second object position likelihood determination means 105 of the second observation device 102.

As the first detection unit 101a of the first observation device 101, for example, the tag reader 304 may be used.

The first object position likelihood determination means 103 determines the first position likelihood (the first object position likelihood) of the person 302 detected by the first detection unit 101a of the first observation device 101. In the case when, for example, the tag reader 304 is used as the first detection unit 101a of the first observation device 101, the first object position likelihood determination means 103 can determine the first position likelihood of the person 302 by using the principle of trilateration. More specifically, the installation position of each of the radio tag readers is preliminarily stored in the inner storage unit in the first object position likelihood determination means 103, or in the first inner storage unit 110, or the like. Then, the first object position likelihood determination means 103 draws a spherical body centered on the installation position of each radio tag reader, based upon the position at which the tag 303 is detected by each radio tag reader. More specifically, the first object position likelihood determination means 103 is allowed to draw a spherical surface, with a distance, calculated by the detected position and the installation position, serving as a radius. At this time, the first object position likelihood determination means 103 determines a position at which the highest number of spherical surfaces are overlapped with one another as a position at which the tag 303 possessed by the person 302 is located, that is, a position at which the person 302 is present.

The first object ID likelihood determination means 104 determines the first ID likelihood (first object ID likelihood) of the person 302 detected by the first detection unit 101a of the first observation device 101. In the case when the tag reader 304 is used as the first detection unit 101a of the first observation device 101, by recording the ID of the person 302 in the tag 303, the tag reader 304 is allowed to directly read from the tag 303 the ID of the person 302 recorded in the tag 303. With this arrangement, the first ID likelihood of the person 302 is made to have the probability of being the ID of the person 302 of 1. In the case when no ID of the person 302 is recorded in the tag 303, for example, a person ID conversion table that allows the determination of the first ID likelihood of the person 302 from the tag ID may be used. FIG. 4 shows an example of the person ID conversion table. In the person ID conversion table of FIG. 4, for example, when a tag corresponding to tag ID=T4 is detected, this indicates that a person having a person ID=H1 has been detected. The person ID conversion table may be recorded in the first inner storage unit 110 of the first observation device 101. Moreover, this may be preliminarily recorded in an external data base or the like, and the first object ID likelihood determination means 104 may acquire necessary information from the external data base, and determine the first ID likelihood of the person 302.

FIG. 5 shows an example of detection of a person by the first observation device 101. FIG. 5 is an output example of the tag reader 304 having an observation cycle of 1 second, and an observation ID, a point of time at which the person 302 is detected, a position (xy coordinates) at which the person 302 is detected, and a tag ID possessed by the person 302 are outputted respectively. For example, a person 302 having a tag ID=T4 is detected at a position (150,210) at a point of time 2008/09/02_12:00:00 so that an observation ID=OBS_TAG_001 is outputted as first observation information. In the same manner, with respect to tag IDs=T7, T8, an observation ID=OBS_TAG_002 serving as the first observation information and an observation ID=OBS_TAG_003 serving as the first observation information are respectively outputted (in the following description, "as the first observation information" is omitted). Additionally, the first observation device 101 is supposed to have a first timer 101t used for acquiring pieces of information such as an observation cycle and time.

The following explanation will be given by exemplifying a structure in which the tag reader 304 is used as the first detection unit 101a of the first observation device 101.

Figure 14:
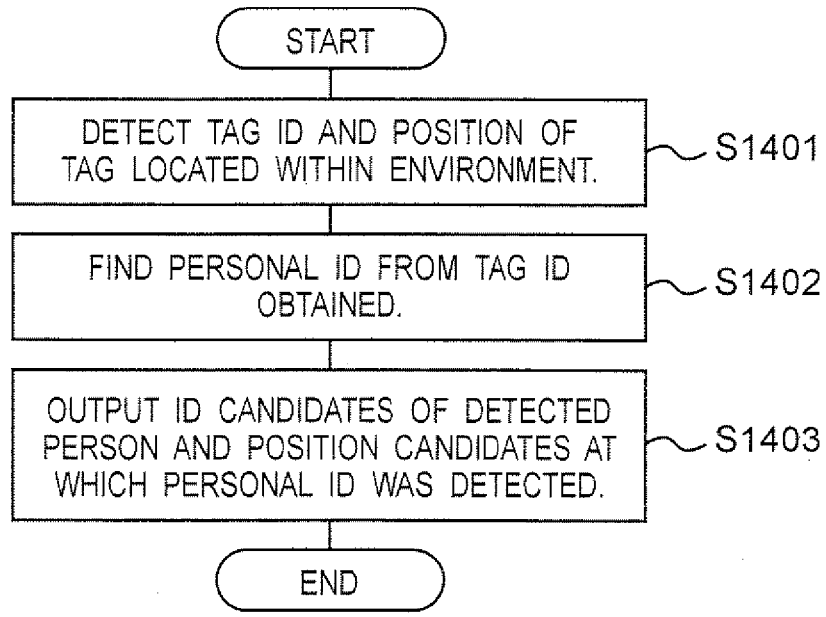
FIG. 14 is a flow chart that shows processes of the first observation device in the room that is an observation object of the object position estimation system in accordance with the first embodiment of the present invention.

Referring to a flow chart shown in FIG. 14, the following description will discuss the contents of processes of the tag reader 304.

In step S1401, a tag 303, located in a room 301 that is a specific example of the environment, is detected by the first detection unit 101a, and the ID and position of the tag 303 are detected by the first detection unit 101a. Based upon the position of the tag 303, the first position likelihood is determined by the first object position likelihood determination means 103.

In step S1402, the ID of the person 302 having the tag 303 is detected by the first detection unit 101a, and the first ID likelihood of the person is determined by the first object ID likelihood determination means 104.

In step S1403, the first ID likelihood and the first position likelihood of the person are outputted from the first observation device 101 to the object position estimation means 108.

<Explanation of Second Observation Device>

The second observation device 102 is provided with a second detection unit 102a functioning as a second observation unit, an image processing unit 102b, a second object position likelihood determination means 105, an object tracking state determination means 106, and a second inner storage unit 111. In the second observation device, the second position likelihood (second object position likelihood) of a person 302 that is present in a room 301 and information of a tracking state (tracking state information) of the person 302 are acquired by the second observation device 102, and these pieces of information are respectively outputted to the second object ID likelihood determination means 107, the object position estimation means 108, and the association means 109 from the second observation device 102. For example, a camera 305 may be used as the second detection unit 102a of the second observation device 102.

In order to detect the person 302 by using the camera 305, it is necessary to process image data acquired by the camera 305 serving as one example of the second detection unit 102a, in the image processing unit 102b. As the processing method, for example, a background differential method may be used in the image processing unit 102b. The method is explained as follows: Background image data of an environment where no person 302 is present, for example, the room 301, which has been preliminarily picked up by the camera 305, and current image data picked up by the camera 305 are compared with each other in the image processing unit 102b. Thereafter, a region where pixel values are different is taken out by the image processing unit 102b as a differential region. The differential region is detected by the image processing unit 102b as being the person 302. In this case, since there is a possibility that noise is mingled in the image data, the image processing unit 102b may determine that the differential region is not the person 302 in the case when the image processing unit 102 has determined that the differential region is sufficiently smaller in comparison with the person 302. In this case, the state in which the differential region is sufficiently smaller in comparison with the person 302 is considered to be a state in which the number of pixels in the differential region is a threshold value or less, which has been preliminarily set based upon the minimum number of pixels that can be recognized as the person 302.

The second object position likelihood determination means 105 determines the second position likelihood (second object position likelihood) of the person 302 detected by the second detection unit 102a and the image processing unit 102b in the second observation device 102. Suppose that the camera 305 serving as one example of the second detection unit 102a of the second observation device 102 is installed in such a manner as to look down on the ground vertically from a ceiling. In this case, for example, the second object position likelihood determination means 105 can determine the second position likelihood of the person 302 based upon the center-of-gravity position of the differential region acquired by the image processing unit 102b.

The object tracking state determination means 106 determines information of a tracking state of the person 302 (tracking state information) detected by the second detection unit 102a and the image processing unit 102b of the second observation device 102. In the case when a camera 305 serving as one example of the second detection unit 102a of the second observation device 102 is used, for example, by storing a color distribution of a differential region acquired by the image processing unit 102b in the second inner storage unit 111, the tracking of the person 302 can be achieved. Referring to a person detection history data base stored in the second inner storage unit 111 shown in FIG. 6, the tracking process will be explained. FIG. 6 shows an output history of the camera 305 having an observation cycle of one second, which records an observation ID, a point of time at which the person 302 has been detected, a position (xy coordinates) at which the person 302 has been detected, and an amount of color features of the person 302. Second observation information of observation ID=OBS_CAM_001 represents the fact that the camera 305 has detected the person 302 at a position (150, 410) at a point of time of 2008/09/02_12:00:00. Moreover, red is recorded as the amount of color features, and as a result of an analysis of the color distribution of the differential region by the image processing unit 102b, it is indicated that the component of a red color is the largest. Second observation information of observation ID=OBS_CAM_004 (hereinafter, "observation ID=" and "of the second observation information" are omitted), which corresponds to a detection one second thereafter, also has red recorded in its amount of color features. At this time, since the amount of color features is the same, it is estimated that the person 302 detected at OBS_CAM_004 is the same person as a person 302 detected at OBS_CAM_001. For this reason, the object tracking state determination means 106 determines that OBS_CAM_004 is tracking state information obtained by tracking OBS_CAM_001. With respect to the person 302 detected at OBS_CAM_001, since no observation ID having the same amount of color features is previously present, the object tracking state determination means 106 determines the fact that the person is first detected as its tracking state information. In this case, as the amount of color features, an RGB component ratio or the like may be used. In this case, the second observation device 102 is supposed to have a second timer 102t used for acquiring an observation cycle and information of time.

The following description will discuss a state in which no OBS_CAM_004 is obtained. In the previous observation in which OBS_CAM_007 was obtained, no observation value having the same amount of "red" color feature as OBS_CAM_007 was obtained. In the case when the detection performance of the person of the camera 305 is high, the object tracking state determination means 106 may determine that OBS_CAM_007 corresponds to a person detected for the first time. In contrast, in the case when the detection performance of the person of the camera 305 is low, by determining that the detection of the person was erroneously made in the previous observation obtaining OBS_CAM_007, the object tracking state determination means 106 may determine that OBS_CAM_001 which had the same amount of "red" color feature in the previous observation value corresponds to the same person as OBS_CAM_007.

In the above example, the object tracking state determination means 106 has determined as its tracking state information that the person 302 detected as OBS_CAM_004 is the same person 302 detected as OBS_CAM_001, However, even when the same amount of color feature is detected as OBS_CAM_001 and as OBS_CAM_004, the object tracking state determination means 106 sometimes determines that respectively different persons have been detected based upon a difference in the detection times and a difference in the detection positions. For example, in the case when it is clear that a movement from the detected position (150, 401) of OBS_CAM_001 to the detected position (320, 390) of OBS_CAM_004 is never achieved by a person's walking speed within a difference between detected times, such a determination is made. As such a determination criteria, for example, a case is considered in which the distance between the detected position (150, 401) and the detected position (320, 390) is greater than a possible walking distance given by a product of the period of time and the person's highest walking speed (for example, 5 meters per second).

In the above example, however, in the case when two persons having the same amount of color feature pass each other, it is not possible for the object tracking state determination means 106 to determine which previously obtained observation ID the observation ID obtained at this time is derived from through its tracking process.

Figure 17:
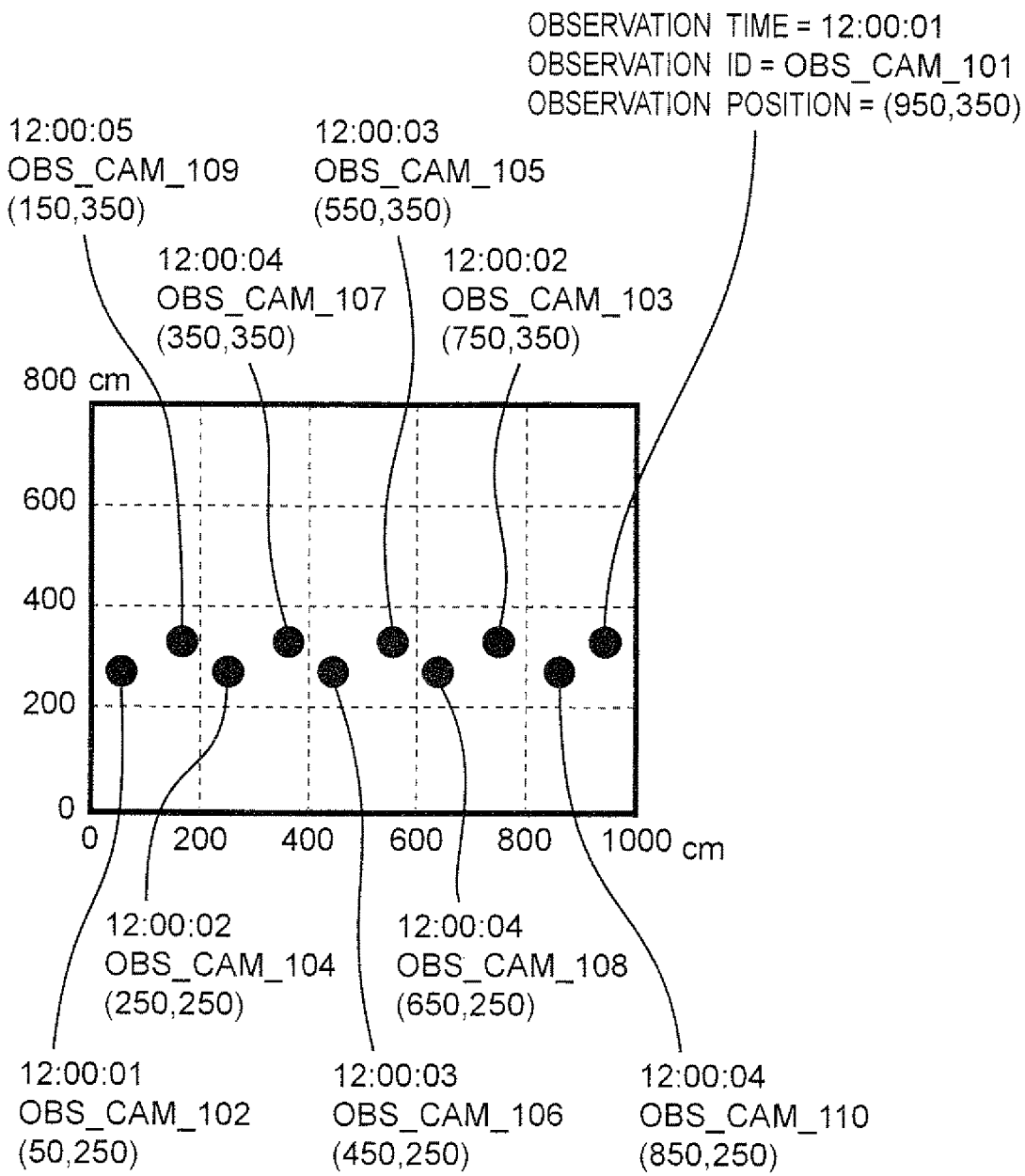
FIG. 17 is a drawing that explains an observation state of a camera in the case when two persons having the same amount of color characteristic respectively pass each other, in the object position estimation system in accordance with the first embodiment of the present invention.

In this case, the object tracking state determination means 106 may take person's movement models into account. FIG. 17 shows an observation state of the camera 305 when two persons respectively having the same amount of color feature pass each other. Additionally, observation values of the tag reader 304 are supposed to be also obtained; however, those values are omitted in this case.

As described earlier, at time 12:00:02, the object tracking state determination means 106 determines that OBS_CAM_103 serving as tracking state information is an observation value obtained by tracking OBS_CAM_101 that has the same amount of color feature, and is capable of reaching within one second. In the same manner, the object tracking state determination means 106 also determines that OBS_CAM_104 is an observation value obtained by tracking OBS_CAM_102 that has the same amount of color feature, and is capable of reaching within one second.

In this case, not only the amount of feature, but also the period of time during which the object is present is taken into account because of the following reasons: If observation IDs can be mutually associated with each other as pieces of tracking state information by using only the amount of feature of objects and can also be dealt as pieces of tracking state information, it is quite simple. However, actually, it is supposed that there are cases in which a plurality of objects having the same amount of feature are present for example, there is a case in which persons wearing the same clothes are present). In such a case, not only the amount of feature, but also the position at which the object is present for each point of time may be taken into account so as to associate observation IDs with one another. Rules may be preliminarily determined in which, for example, when persons are moving at places 100 m or more apart from each other within one second, they are not associated with each other even when they have the same amount of feature, and these rules may be stored and applied to the object tracking state determination means 106.

Based upon these, the object tracking state determination means 106 determines that OBS_CAM_103 is advancing in −x-direction at 2 m per second and that OBS_CAM_104 is advancing in +x-direction at 2 in per second.

At time 12:00:03, there are two observation values OBS_CAM_103 and OBS_CAM_104 that have the same amount of color feature and are capable of shifting within one second as observation values serving as tracking origins for OBS_CAM_105. At this time, the object tracking state determination means 106 refers to pieces of information of advancing history of OBS_CAM_103 and OBS_CAM_104 of the person detection history data base of the second inner storage unit 111 so that the object tracking state determination means 106 determines which observation value corresponds to an observation value of the tracking origin for OBS_CAM_105. Since OBS_CAM_103 was advancing in the −x-direction at 2 m per second, the object tracking state determination means determines that the possibility that the next observation (observation at time 12:00:03) can be obtained at coordinates (550, 350) is high. Moreover, since OBS_CAM_104 was advancing in the +x-direction at 2 m per second, the object tracking state determination means determines that the possibility that the next observation can be obtained at coordinates (450, 250) is high.

In this case, the object tracking state determination means 106 can determine that OBS_CAM_105 was obtained at coordinates (550, 350), and corresponds to an observation value obtained by tracking OBS_CAM_103. In the same manner, the object tracking state determination means 106 can determine that OBS_CAM_106 corresponds to an observation value obtained by tracking OBS_CAM_104.

Additionally, as described earlier, the person detection history data base may be recorded in the second inner storage unit 111 of the second observation device 102. Moreover, this data base may be recorded in an external data base or the like, and the object tracking state determination means 106 may acquire necessary information from the external data base or the like, if necessary, so as to obtain information of the object tracking state. Additionally, the observation cycles of the first observation device 101 and the second observation device 102 are not necessarily made the same.

The following explanation will be given by using a camera 305 as one example of the second detection unit 102a of the second observation device 102.

Figure 15:
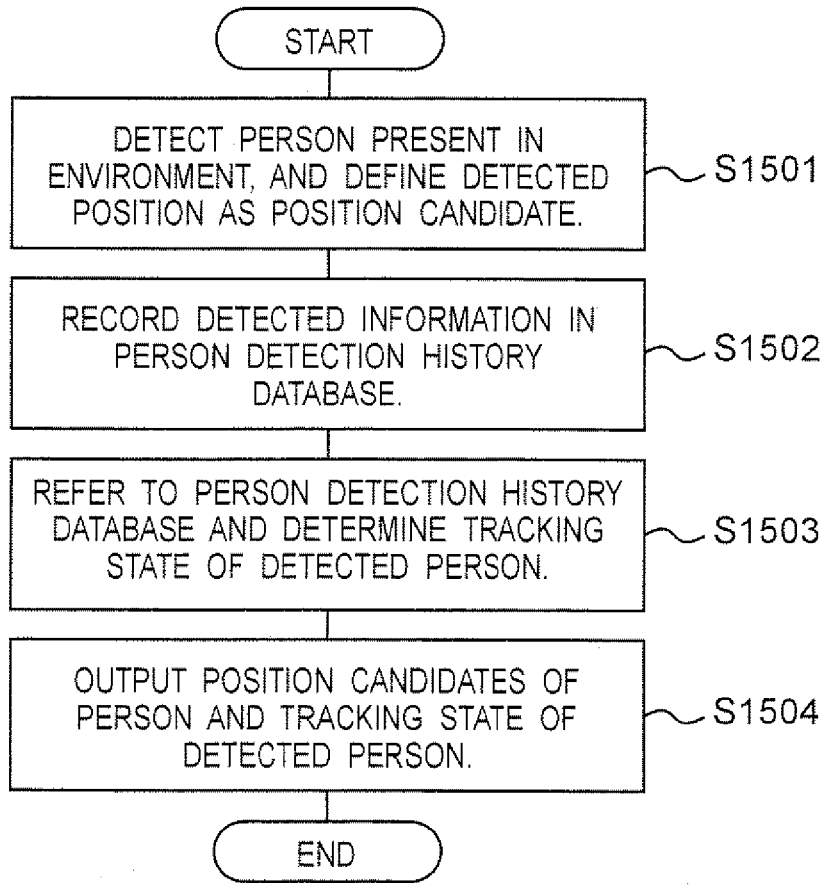
FIG. 15 is a flow chart that shows processes of the second observation device in the room that is an observation object of the object position estimation system in accordance with the first embodiment of the present invention.

Referring to a flow chart of FIG. 15, the following description will discuss the processing contents of the camera 305.

In step S1501, the second detection unit 102a detects a person 302 that is present in a room 301 serving as a specific example of the environment, and based upon the position detected by the image processing unit 102b, the second object position likelihood determination means 105 determines the second position likelihood.

In step S1502, pieces of information detected by the second detection unit 102a and the image processing unit 102b are recorded in the person detection history data base of the second inner storage unit 111 by the second detection unit 102a and the image processing unit 102b.

In step S1503, the object tracking state determination means 106 refers to the person detection history data base so that the tracking state of the person 302 detected by the second detection unit 102a and the image processing unit 102b is determined by the object tracking state determination means 106.

In step S1504, the second position likelihood and the tracking state information are outputted to the second object ID likelihood determination means 107, the object position estimation means 108, and the association means 109, respectively, from the second observation device 102.

In this case, as the observation cycle of the first observation device 101 and the second observation device 102 becomes shorter, the number of times for object position estimations increases so that the position estimation precision becomes higher.

<Explanations of Association Means and Object Position Estimation Means>

Based upon the first ID likelihood and the first position likelihood of the person 302 determined (detected) by the first observation device 101, the second position likelihood of the person 302 determined (detected) by the second observation device 102, and the second ID likelihood determined by the second object ID likelihood determination means 107, the object position estimation means 108 estimates the position of the person 302.

More specifically, the following method is used. Upon receipt of the first ID likelihood and the first position likelihood described below as the method for estimating the position, the association means 109 calculates an association value based upon the first ID likelihood and the first position likelihood of the object, thus received.

Based upon the first ID likelihood and the first position likelihood of the object received from the first observation device 101, the second position likelihood of the object received from the second observation device 102, and the second ID likelihood of the object received from the second object ID likelihood determination means 107, the association means 109 finds which object ID the detected object has, on the basis of probability. The detection of the object is carried out by the first detection unit 101a of the first observation device 101, and the second detection unit 102a and the image processing unit 102b of the second observation device 102. In this explanation, the first observation device 101 and the second observation device 102 are collectively referred to as "observation devices", the first ID likelihood and the second ID likelihood are collectively referred to as "ID likelihoods", and the first position likelihood and the second position likelihood are collectively referred to as "position likelihoods".

Here, the probability value found by the association means 109 is referred to as "association value". More specifically, the association value is a value that indicates a relationship between pieces of information of the ID likelihood and position likelihood observed by the observation device and an actual object (with respect to the second ID likelihood, its output is obtained by the second object ID likelihood determination means). That is, the value represents probability as to which object ID is detected to obtain values corresponding to the ID likelihood and position likelihood received by the observation device. The ID likelihood and the position likelihood of the object, described earlier, correspond to values that represent certainty as to the fact that the respective pieces of observation information (observation data) are information (data) obtained by observing a certain object. Moreover, the association value is represented by a product of the ID likelihood and the position likelihood. Additionally, the second ID likelihood of the object, detected by the second observation device 102 to be used for calculating the association value in the association means 109, is calculated not by the second observation device 102, but by the second object ID likelihood determination means 107.

Upon completion of calculations of the association value by the association means 109, the object position estimation means 108 estimates the position of the person 302 based upon the calculation results of the association means 109 and the tracking state information of the object. Additionally, the completion of the calculations of the association value by the association means 109 can be determined by the input of the calculation results in the association means 109 into the object position estimation means 108 from the association means 109. When the information relating to the calculation results is inputted to the object position estimation means 108 from the association means 109, the object position estimation means 108 determines that the calculations of the association value have been completed. Then, based upon the calculation results in the association means 109 and the tracking state information of the object, the object position estimation means 108 estimates the position of the person 302.

As the estimating method, the frame work of Bayesian estimation typically represented by a Kalman filter may be used in the object position estimation means 108. Based upon the ID likelihood and position likelihood of the person 302 obtained from the second observation device 102, the position estimation is carried out by the object position estimation means 108, and at this time, the amount of update of the position of the person 302 is weighted by the association value. Information relating to the weighting process by the association value is outputted from the association means 109 to the object position estimation means 108.

In this case, with respect to the association value, the higher the value, the greater the amount of update of the object position becomes. In other words, observation data having high probability of being observation data for a certain object have a higher rate of devotion to updating the position of the observation data.

<Explanation of Kalman Filter>

The Kalman filter is a filter used for estimating a system state having the highest likelihood on the assumption that information of a system state (for example, the object position in the first embodiment of the present invention) and both of the observation data (observation information) of the first observation device 101 and the second observation device 102 contain noise. In other words, among the candidates that can be taken by the system, the state having the highest probability is estimated.

Figure 2:
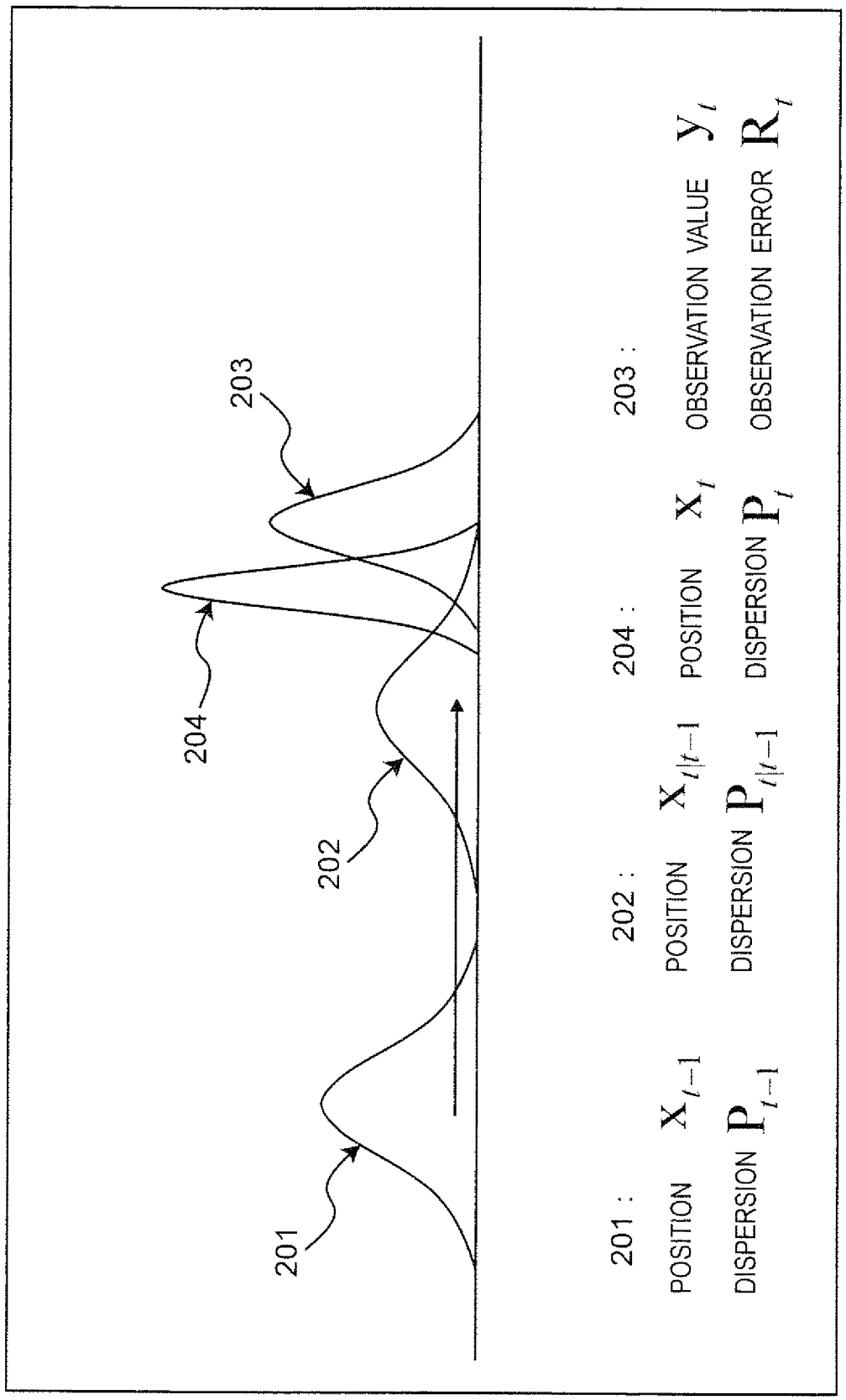
FIG. 2 is a graph that shows an operation example of Kalman filter to be used in the object position estimation system in accordance with the first embodiment of the present invention.

FIG. 2 shows an example in which a Kalman filter is used for the object position estimating process. The axis of ordinates represents the probability, and the axis of abscissas represents the position.

When an object makes a movement as indicated by the following (equation 1), the second observation device 102 can obtain an observation value 203 found by the following (equation 2). In this case, A represents a movement model of the object, x represents an object position, and v represents a process noise generated upon the movement. Moreover, y represents an observation value, H represents an observation model that makes the object position x and the observation value y associated with each other, w represents an observation noise, and t represents time.

[Formula 1]

$$X_t = A x_{t-1} + v_t \quad \text{(Equation 1)}$$

[Formula 2]

$$y_t = H x_t + w_t \quad \text{(Equation 2)}$$

In this case, supposing that the process noise v and observation noise w are white Gaussian noise, p(w) is indicated by the following (equation 3), and p(v) is indicated by the following (equation 4). In this case, N (0, Q) represents a Gaussian distribution having an average of 0 and a dispersion of Q. In the same manner N (0, R) represents a Gaussian distribution having an average of 0 and a dispersion of R.

[Formula 3]

$$p(w) \sim N(0, Q) \quad \text{(Expression 3)}$$

[Formula 4]

$$p(v) \sim N(0, R) \quad \text{(Expression 4)}$$

When the observation value 203 has been obtained, the object position estimation means 108 updates a preliminary probability distribution 201 (hereinafter, referred to as "preliminary distribution") relating to the position of the object currently obtained so that the object position estimation means 108 forms a predicted probability distribution 202 (hereinafter, referred to as "predicted distribution"). The object position estimation means 108 finds the average (position) of the predicted distribution 202 based upon (equation 5), and the object position estimation means 108 also finds the dispersion of the predicted distribution 202 based upon (equation 6). Additionally, $X_{a|b}$, represents an estimated value of X at time a based upon information at time b. For example, "$x_{t|t-1}$" of (equation 5) represents an estimated value of an object position x at time t based upon information at time t−1, and "$P_{t|t-1}$" of (equation 6) represents an estimated value of P at time t based upon information at time t−1. In this case, P represents the dispersion of the distribution.

[Formula 5]

$$x_{t|t-1} = A_t X_{t-1|t-1} \quad \text{(Expression 5)}$$

[Formula 6]

$$P_{t|t-1} = A_t P_{t-1|t-1} A_t^T + Q_t \quad \text{(Expression 6)}$$

When the predicted distribution 202 has been obtained by the object position estimation means 108, the object position estimation means 108 finds a post distribution 204 from the observation value 203 and the predicted distribution 202. The average (position) of the post distribution is found by the object position estimation means 108 from (equation 7), and the dispersion of the post distribution can be found by the object position estimation means 108 from (equation 8). In this case, K represents a value referred to as a Kalman gain, which is found by (equation 9). The Kalman gain is a value used for determining the amount of update. In the case when the precision of the observation value is good (the dispersion R is very small), the value of the Kalman gain becomes greater so as to increase the amount of update. In contrast, in the case when the precision of the preliminary distribution is good (the dispersion P is very small), the value of the Kalman gain becomes smaller so as to reduce the amount of update.

Additionally, in the case when the amount of update of the position of an article A is weighted by using the association value, as will be described later, equation (9) can be replaced by equation (9A). In equation (9A), "D" represents an association value relative to the article A.

[Formula 7]

$$x_{t|t} = x_{t|t-1} + K_t(y_t - H_t x_{t|t-1}) \quad \text{(Expression 7)}$$

[Formula 8]

$$P_{t|t} = (1 - K_t H_t) P_{t|t-1} \quad \text{(Equation 8)}$$

[Formula 9]

$$K_t = P_{t|t-1} H_t^T (H_t P_{t|t-1} H_t^T + R_t)^{-1} \quad \text{(Equation 9)}$$

$$K_t = P_{t|t-1} H_t^T (H_t P_{t|t-1} H_t^T + R_t / D_{ObjectA})^{-1} \quad \text{(Equation 9A)}$$

FIG. 7 shows an example of an output history of the object position estimation means 108. In this case, it is supposed that the object position estimation means 108 confirms a positional error characteristic, such as a standard deviation relating to positions between the first observation device 101 and the second observation device 102. In other words, it is supposed that the information of the positional error characteristic, such as the standard deviation relating to the positions between the first observation device 101 and the second observation device 102, is inputted to the object position estimation means 108, and stored in the inner storage unit or the like of the object position estimation means 108.

<Explanation of Second Object ID Likelihood Determination Means>

Based upon the object tracking state information of the object tracking state determination means 106 and the association value found by the association means 109, the second object ID likelihood determination means 107 determines the second ID likelihood (second object ID likelihood) in the observation value observed by the camera 305 and the image processing unit 102b.

When the observation value observed by the camera 305 and the image processing unit 102b is an observation value that has been first observed, the second object ID likelihood determination means 107 determines that the observation value has the possibility of corresponding to any one of persons that are all present in a room 301. That is, in the case when three persons, that is, a person 302A, a person 302B, and a person 302C, are present in the room 301, the second object ID likelihood determination means 107 determines that the observation value observed by the camera 305 and the image processing unit 102b is obtained by observing the three persons with the same probability (1/3). More specifically, the probability of the observation value that is obtained by detecting person ID=H1 (for example, the person 302A) is 1/3, the probability of the observation value that is obtained by detecting person ID=H2 (for example, the person 302B) is 1/3, and the probability of the observation value that is obtained by detecting person ID=H3 (for example, the person 302C) is 1/3; thus, the second ID likelihoods of the persons are respectively determined. As described earlier, FIG. 7 shows an example of an output view showing the results of estimations by the object position estimation means 108, and the estimation position (estimated position) is calculated based upon the preliminary estimated position of the person and the observation value of the observation device. In this case, in the estimation results at time 12:00:00, since the preliminary estimation position of the person is the initial value (in this example, the center of the room), it is difficult to estimate the person's position at a right position, even when calculations are carried out, with the observation value of the observation device being included. By successively updating the position of the person each time an observation value of the observation device is obtained, for example, at time 12:00:001, time 12:00:002, . . . , and so on, the estimation precision of the person's position is improved, and this can be understood by FIG. 7.

By using the second ID likelihood determined by the second object ID likelihood determination means 107, as described above, the association value is found by the association means 109, based upon the person's ID and the position of the person that is being currently estimated. The association value, thus found, is stored in an association value data base 109a of the inner storage unit that is built in the association means 109.

FIG. 8 shows an example of the association value data base 109a. In the association value data base 109a, the observation ID of the camera 305 serving as one example of the second detection unit 102a of the second observation device 102 and association values relative to the respective persons 302 are recorded. In accordance with FIG. 8, the person detected as OBS_CAM_004 has the highest probability of 0.69 of being the person HUM_001, the next highest probability of 0.19 of being the person HUM_002, and the lowest probability of 0.12 of being the person HUM_003. With respect to the other observation IDs, association values relating to the respective persons are recorded in the same manner. In this case, the association value data base 109a may be recorded in the inner storage unit of the association means 109. Moreover, this may be recorded in an external data base or the like, and the association means 109 may acquire necessary information from the external data base, if necessary, and then calculate association values.

In the case when the observation value observed by the camera 305 and the image processing unit 102b is an observation value obtained by tracking the previous observation value, the second object ID likelihood determination means 107 determines the previous association value found by the association means 109 based upon the previous observation value associated with the above-mentioned observation value as the second ID likelihood. Then, by using the second ID likelihood determined by the second object ID likelihood determination means 107, the association means 109 finds the current association value based upon the person's ID and the position of the person that is being currently estimated. The association value thus found is recorded in the association value data base 109a by the association means 109.

The following description will discuss the possibility of the camera 305 failing to track the observation value. Even when the camera 305 outputs from the second observation unit 102 to the second object ID likelihood determination means 107 an observation value as the result of tracking the same object by making the previous observation value associated with the observation value currently obtained, there is a possibility that, actually, an observation value obtained by observing another person appeared for the first time might be detected by the camera 305 and the image processing unit 102b due to influences of noise or the like. Therefore, by introducing a probability variable T that allows the camera 305 to correctly track the observation value to the second object ID likelihood determination means 107, the second ID likelihood determination means 107 may determine the second ID likelihood in accordance with (equation 10).

In (equation 10), $p_{id}$ represents a second ID likelihood, r represents an association value, N represents the number of persons present in the room 301, and t represents time.

It is indicated by (equation 10) that, when the probability variable T=0, the tracking positively causes a failure, or it is considered that an observation value is first detected, so that the second ID likelihood $p_{id}$ of the observation value is represented by (equation 11).

Moreover, when the probability variable T=1, the tracking is considered to be positively successful so that the second ID likelihood $p_{id}$ of the observation value is represented by (equation 12).

That is, in other words, the object tracking state determination means 106 outputs a tracking success likelihood that indicates the probability of successful tracking of the object and a tracking failure likelihood that indicates the probability of failure in tracking the object. The second object ID likelihood determination means 107 provides a sum of a value obtained by multiplying the association value calculated upon the previous detection of the object by the tracking success likelihood and a value obtained by dividing the tracking failure likelihood by the number of all the objects serving as detection subjects, as the second ID likelihood $p_{id}$ of the object. In this case, the tracking success likelihood corresponds to the probability variable T, and the tracking failure likelihood corresponds to (1−T).

The way how to find the second ID likelihood $p_{id}$ that forms the operation result of the second object ID likelihood determination means 107 is carried out such that in the case of successful tracking of the object, the ID likelihood of the object is estimated based upon the association value of the previous observation value. However, actually, there is a possibility of a failure in tracking the object. Therefore, the estimated ID likelihood is assigned by a portion corresponding to the probability of the tracking success likelihood, based upon the association value of the previous observation value. This corresponds the left side $(r_{t-1}T_t)$ of (equation 10).

In contrast, in the case of the failure in tracking the object, since no estimation is obtained as to which ID the object has; therefore, since there is a possibility that the ID corresponds to any one of the objects, the probability is evenly assigned. This means that the evenly assigning process is carried out for the portion of the tracking failure likelihood (1−T). This corresponds the right side $\{(1-T_t)/N\}$ of (equation 10) (where N=the number of objects). In the case of the successful tracking of the object, since the probability variable T=1, the value of the right side $\{(1-T_t)/N\}$ of (equation 10) becomes 0, with the value of the left side $(r_{t-1}T_t)$ of (equation 10) being set to $r_{t-1}$, so that (equation 12) is obtained. In the case of the positive failure of the tracking, T=0, and the value of the left side $(r_{t-1}T_t)$ of (equation 10) becomes 0, with the value of the right side $\{(1-T_t)/N\}$ of (equation 10) being set to $\{1/N\}$, so that (equation 11) is obtained.

With respect to the way how to find the probability variable T in the second object ID likelihood determination means 107, for example, a method is proposed in which, preliminary experiments are carried out so that a probability of actual successful tracking is determined, and the resulting information is stored in the inner storage unit of the second object ID likelihood determination means 107. Moreover, in the case when, as described in the object tracking method of the second observation device 102, a plurality of observation values that cannot be identified by the amount of color feature or the like are closely located with one another, with the result that the probability of a failure in tracking becomes higher, the second object ID likelihood determination means 107 may carry out, for example, such a process as to lower the value of the probability variable T. In this case, as to whether or not an actual case corresponds to "the case in which a plurality of observation values that cannot be identified by the amount of color feature or the like are closely located with one another", the second object ID likelihood determination means 107 may make a determination, for example, in the following manner. In the case when, supposing that the sensor carries out an observation once every one second, there are three persons or more (who are being subjected to estimation processes) within a distance in which the person can proceed per one second (for example, a circle with a radius of 3 m), the second object ID likelihood determination means 107 determines that the closely located state occurs within the distance. Moreover, in the case when all the three persons have the same amount of color feature, it may carry out, for example, such a process as to further lower the value of the probability variable T.

[Formula 10]

$$p_{id} = f(r_{t-1}, T_t, N) = r_{t-1}T_t + \frac{1-T_t}{N} \quad \text{(Equation 10)}$$

[Formula 11]

$$P_{id} = \frac{1}{N} \quad \text{(Equation 11)}$$

[Formula 12]

$$p_{id} = r_{t-1} \quad \text{(Equation 12)}$$

Figure 12A:
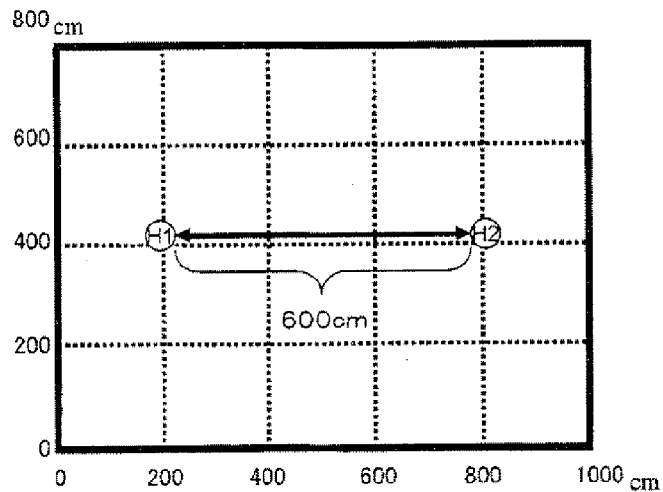
FIG. 12A is a drawing that shows a distance between a person and a detection position at time T in the room that is an observation object of the object position estimation system in accordance with the first embodiment of the present invention.
Figure 12B:
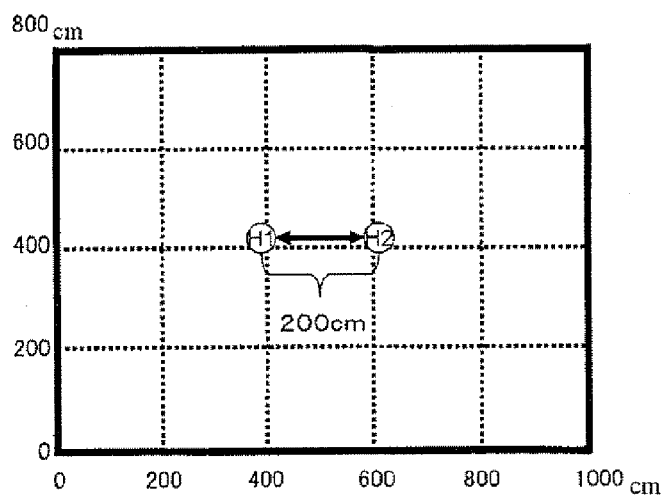
FIG. 12B is a drawing that shows a distance between the person and the detection position at time T+1 in the room that is an observation object of the object position estimation system in accordance with the first embodiment of the present invention.
Figure 13:
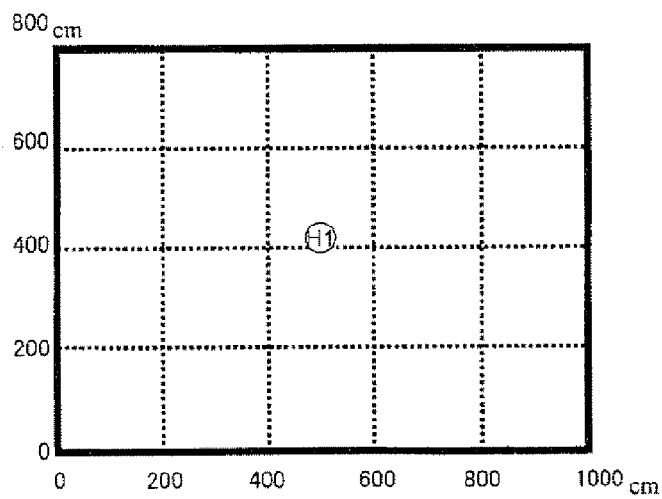
FIG. 13 is a drawing that shows a person detection position at time T+2 in the room that is an observation object of the object position estimation system in accordance with the first embodiment of the present invention.

Furthermore, the following description will discuss a state where two persons are overlapped with each other on the camera screen. FIG. 12A shows a position of a person having a person ID=H1 (hereinafter, referred to simply as "person of H1") and a position of a person having a person ID=H2 (hereinafter, referred to simply as "person of H2"), detected by the camera 305 and the image processing unit 102b at time T, as well as a distance between the detected positions of person of H1 and person of H2. FIG. 12B shows a position of person of H1 and a position of person of H2, detected by the camera 305 at time T+1, as well as a distance between the detected positions of person of H1 and person of H2. The object tracking state determination means 106 determines that from time T to time T+1, the distance between person of H1 and person of H2 is shortened from 600 cm to 200 cm. In this case, it is supposed that the camera 305 is allowed to follow person of H1 and person of H2 by the object tracking state determination means 106. Moreover, FIG. 13 shows a person detection state by the camera 305 at time T+2. FIG. 13 shows that at time T+2, only person of H1 is detected. This is considered to be caused by the fact that, by a blind spot generated by the presence of person of H1, person of H2 is concealed. At this time, the variable r of equation 10 may be set to the average value between the association value of person of H1 at time T+1 and the association value of person of H2 at time T+1. Additionally, by taking it into consideration the possibility that person of H2 has gone out of the room 301, the second object ID likelihood determination means 107 may add the association value of person of H2 obtained by carrying out a weighting process on the association value of person of H1 at time T+1 to the second ID likelihood of person of H1. Moreover, by setting a threshold value to the distance between the detected positions of the persons, the second object ID likelihood determination means 107 can determine whether or not person of H2 is concealed by a blind spot generated by the presence of person of H1. That is, with respect to the detected position A of person of H1, in the case when the second object ID likelihood determination means 107 determines that a detected position B of person of H2 is located within a distance shorter than the threshold value, if person of H1 is not detected, the second object ID likelihood determination means 107 determines that person of H1 is concealed by person of H2. With respect to person of H2 or the other persons, the second object ID likelihood determination means 107 makes the same determination.

<Explanation of Relationship Between Object Position Estimation Means and Second Object ID Determination Means>

Referring to FIGS. 9A to 11F, the following description will explain the object position estimation means 108 and the second object ID likelihood determination means 107.

Figure 9A:
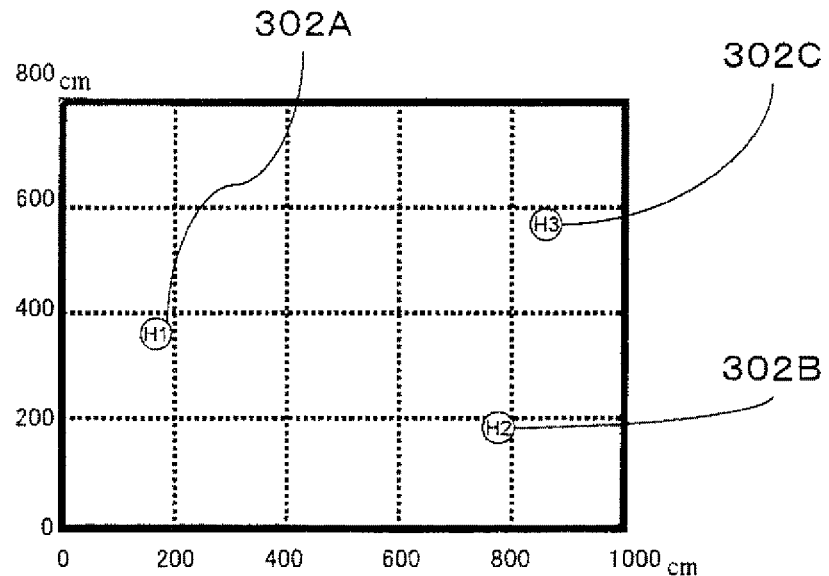
FIG. 9A is a drawing that shows an example of an actual position of a person at the time of 2008/09/02__12:00:00 in a room that is an observation object of the object position estimation system in accordance with the first embodiment of the present invention.
Figure 9B:
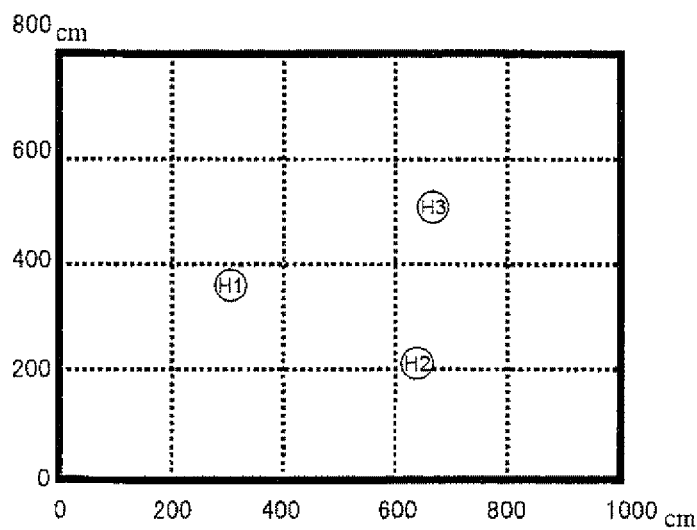
FIG. 9B is a drawing that shows an example of an actual position of the person at the time of 2008/09/02__12:00:01 in the room that is an observation object of the object position estimation system in accordance with the first embodiment of the present invention.
Figure 9C:
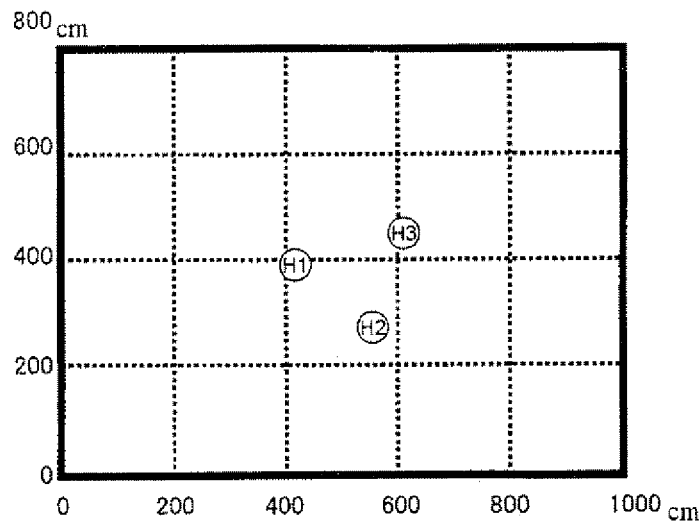
FIG. 9C is a drawing that shows an example of an actual position of the person at the time of 2008/09/02__12:00:02 in the room that is an observation object of the object position estimation system in accordance with the first embodiment of the present invention.

FIGS. 9A to 9C show actual positions of person 302A, person 302B, and person 302C that are present in a room 301. FIG. 9A shows actual positions of person 302A, person 302B, and person 302C at time 2008/09/02_12:00:00. FIG. 9B shows actual positions of person 302A, person 302B, and person 302C at time 2008/09/02_12:00:01. FIG. 9C shows actual positions of person 302A, person 302B, and person 302C at time 2008/09/02_12:00:02. In accordance with FIG. 9A, person 302A of personal ID=H1 (hereinafter "personal ID=" is omitted) was actually present at a position of coordinates (190, 380) at time 2008/09/02_12:00:00. In this case, FIG. 9 are views that explain the object position estimation means 108 and the second object ID likelihood determination means 107, and information indicated in FIG. 9A is not used for the other explanations of the first embodiment of the present invention.

Figure 10A:
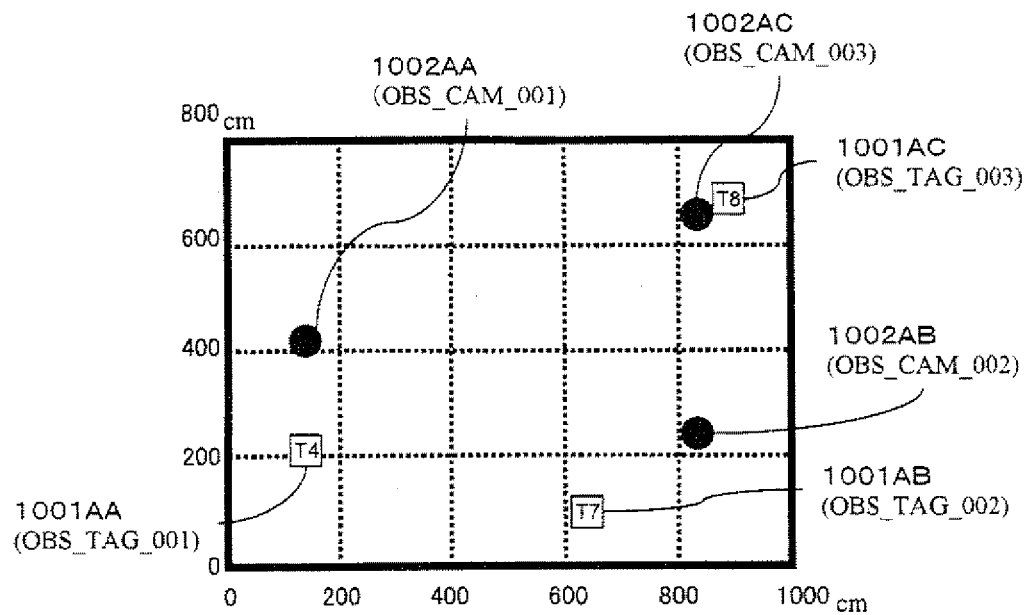
FIG. 10A is a drawing that shows an example of a detected position (observation position) of a person at the time of 2008/09/02__12:00:00 in the room that is an observation object of the object position estimation system in accordance with the first embodiment of the present invention.
Figure 10B:
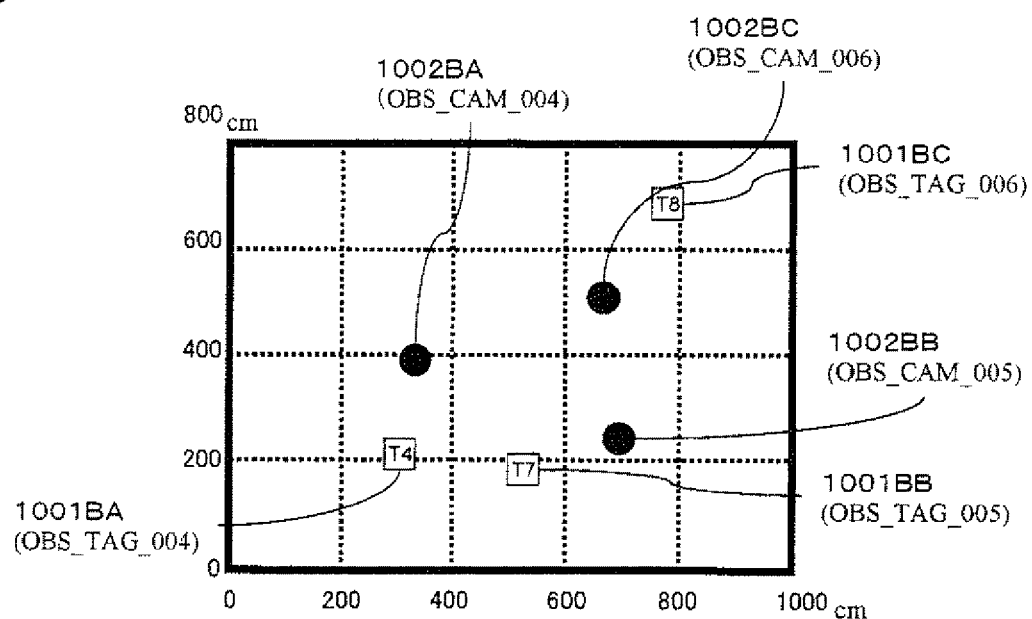
FIG. 10B is a drawing that shows an example of a detected position (observation position) of the person at the time of 2008/09/02__12:00:01 in the room that is an observation object of the object position estimation system in accordance with the first embodiment of the present invention.
Figure 10C:
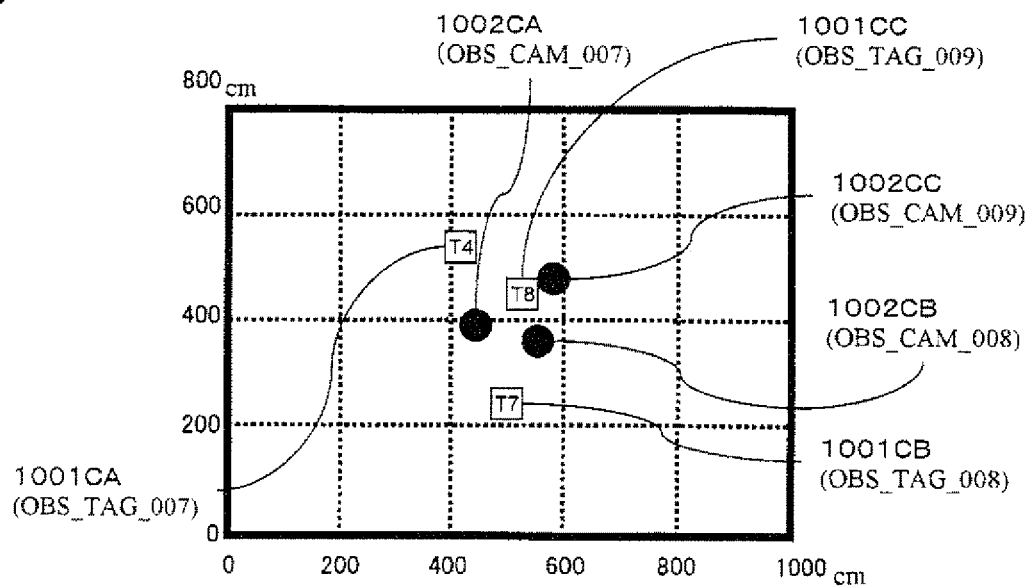
FIG. 10C is a drawing that shows an example of a detected position (observation position) of the person at the time of 2008/09/02__12:00:02 in the room that is an observation object of the object position estimation system in accordance with the first embodiment of the present invention.

FIGS. 10A to 10C show detected states of persons by the tag reader 304 and the camera 305 in the room 301. FIG. 10A shows detected states of persons at time 2008/09/02_12:00:00. FIG. 10B shows detected states of persons at time 2008/09/02_12:00:01. FIG. 10C shows detected states of persons at time 2008/09/02_12:00:02. In accordance with FIG. 10A, three detected positions 1001 of persons are obtained by the tag reader 304, and person 302A of tag ID=T4 (hereinafter, "tag ID=" is omitted, and referred to simply as "tag") is detected at a position of coordinates (150, 210), person 302B of tag T7 is detected at a position of coordinates (620, 100), and person 302C of tag T8 is detected at a position of coordinates (620, 630), respectively (see FIG. 5). In the same manner, three camera detected positions 1002 of persons are obtained, and one person is detected at a position of coordinates (150, 410), one person is detected at a position of coordinates (810, 220), and one person is detected at a position of coordinates (810, 220), respectively (see FIG. 6).

Figure 11A:
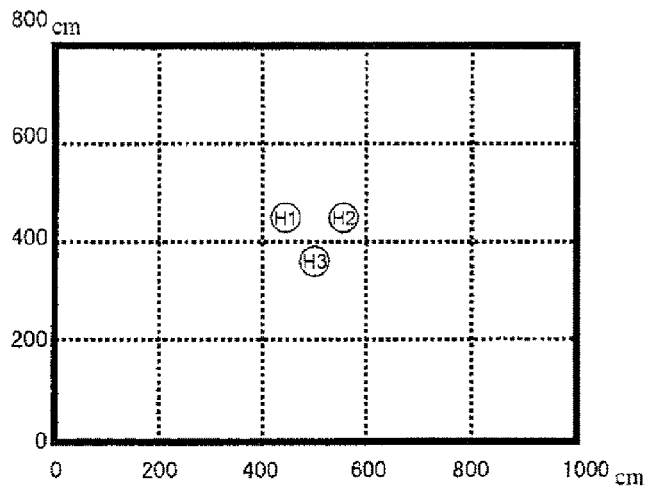
FIG. 11A is a drawing that shows an example of an initial position (position prior to an application of an observation value) in the room that is an observation object, upon activation of the object position estimation system in accordance with the first embodiment of the present invention.

FIGS. 11A to 11F show positions of persons 302 estimated by the object position estimation means 108 in the room 301. FIG. 11A shows the initial position of the estimated position upon activation of the object position estimation system of the first embodiment of the present invention at time 2008/09/02_12:00:00. Although the initial position is determined at random in FIG. 11A, it may be set to the center or the like of the room 301. In the case when the object position estimation system has an environment map (environment map information) in which entrance information or the like of the position of an entrance of the room 301 or the like is described, the entrance of the room 301 may be used as the initial position. In addition to these, the environment map (environment map information) may include blind-spot information of the first observation device or the blind-spot information of the second observation device. In the case when only the entrance information is used for setting the initial position, the environment map (environment map information) having the entrance information recorded therein can be stored in the inner storage unit of the object position estimation means 108. Moreover, an environment map (environment map information) having camera blind-spot information recorded therein, which is referred to by the object tracking state determination means 106, can be stored in the inner storage unit of the second observation device 102.

FIGS. 19A and 19B show examples of the environment map. The environment map includes entrance environment map data in which position coordinates information of an entrance is recorded as shown in FIG. 19A, and camera blind spot environment map data in which blind spot information of the camera is recorded as shown in FIG. 19B. The entrance environment map is stored and recorded in the inner storage unit of the object position estimation means 108, and the camera blind spot environment map is stored and recorded in the inner storage unit of the camera 305.

In the case when the entrance of the room 301 is set as the initial position, the object position estimation means 108 refers to the entrance environment map so that the object position estimation means 108 sets the initial position as (x,y)=(100, 0).

The blind spot of the camera 305 is represented as a rectangular shape having two points recorded in the camera blind spot environment map as orthogonal points.

The following description will discuss a method for utilizing the blind spot of the camera 305.

Suppose that "observation value A" having an amount of red-color feature is obtained at a position (x,y)=(98,99) at time 13:00:00. Moreover, suppose that no observation value having an amount of red-color feature is obtained at time 13:00:01 and time 13:00:02, and that at time 13:00:03, "observation value B" having an amount of red-color feature is obtained at a position (x,y)=(201,202) at time 13:00:03.

In the case when the ID likelihood of the observation value B is obtained in this state, since no observation value having the same amount of feature as that of the observation value B in the previous observation (13:00:02), the observation value B is determined as an observation value that has been first observed. That is, as represented by (equation 11), the ID likelihood is evenly assigned to the IDs of all the persons.

Upon reference to the camera blind spot environment map by the object tracking state determination means 106, it is found that both of the observation value A and observation value B are located close to "camera blind spot 1". That is, the object tracking state determination means 106 determines that there is a possibility of having no observation value because the person enters the blind spot of the camera at time 13:00:01 and time 13:00:02. Therefore, the observation value B is determined by the object tracking state determination means 106 not as an observation value that has been first observed, but as an observation value obtained by tracking the observation value A.

Additionally, with respect to the method for making a determination as to whether or not an observation value is located close to the camera blind spot, the object tracking state determination means 106 may utilize a relationship between an observation cycle of the camera and a walking speed of the person. For example, supposing that the camera observation cycle is once per second and that the walking speed of the person is 70 cm per second, an observation value observed within 70 cm from the camera blind spot is determined as an observation value obtained close the camera blind spot by the object tracking state determination means 106.

Figure 11B:
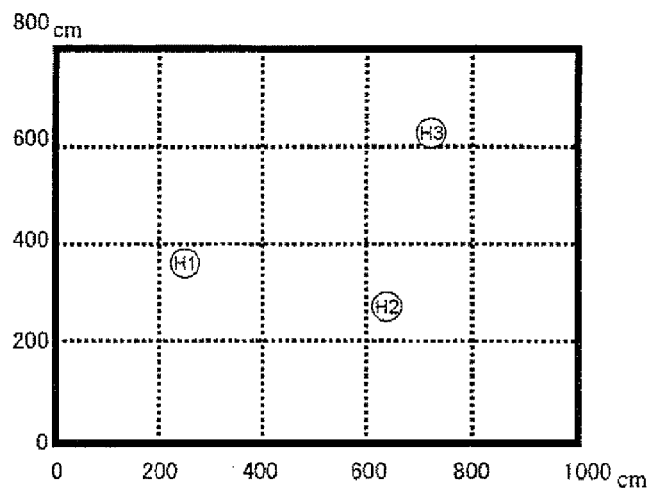
FIG. 11B is a drawing that shows an example of an estimated position (position after the application of the observation value) of a person at the time of 2008/09/02__12:00:00 in the room that is an observation object of the object position estimation system in accordance with the first embodiment of the present invention.
Figure 11C:
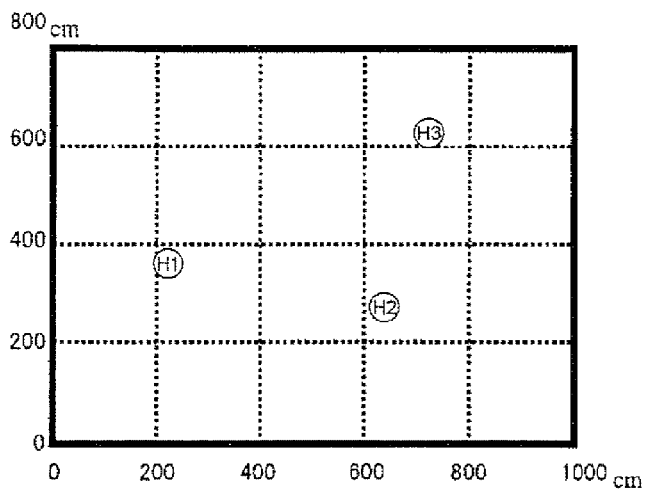
FIG. 11C is a drawing (the same view as FIG. 11B) that shows an example of an initial position (position prior to an application of an observation value) at the time of 2008/09/02__12:00:01 in the room that is an observation object of the object position estimation system in accordance with the first embodiment of the present invention.
Figure 11D:
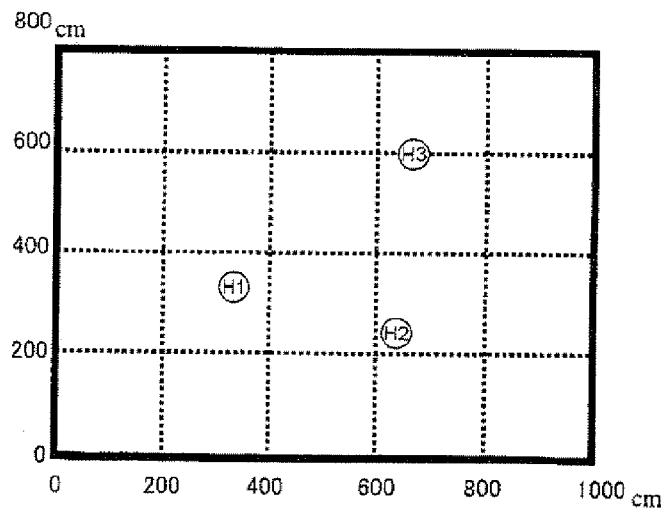
FIG. 11D is a drawing that shows an example of an estimated position (position after the application of the observation value) of the person at the time of 2008/09/02__12:00:01 in the room that is an observation object of the object position estimation system in accordance with the first embodiment of the present invention.
Figure 11E:
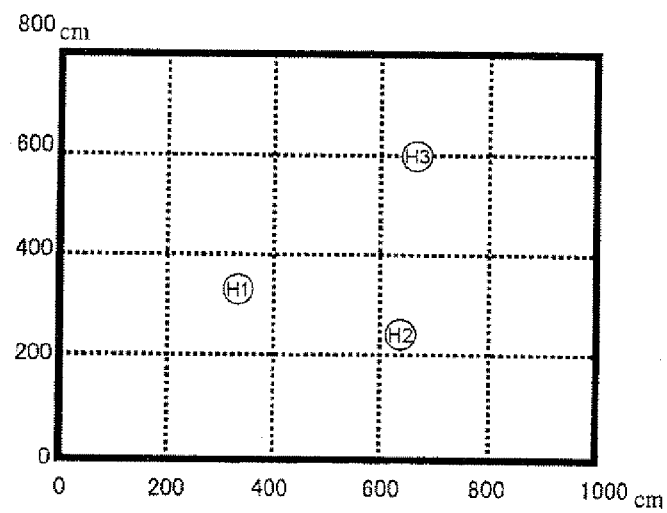
FIG. 11E is a drawing (the same view as FIG. 11D) that shows an example of an initial position (position prior to an application of an observation value) at the time of 2008/09/02__12:00:02 in the room that is an observation object of the object position estimation system in accordance with the first embodiment of the present invention.
Figure 11F:
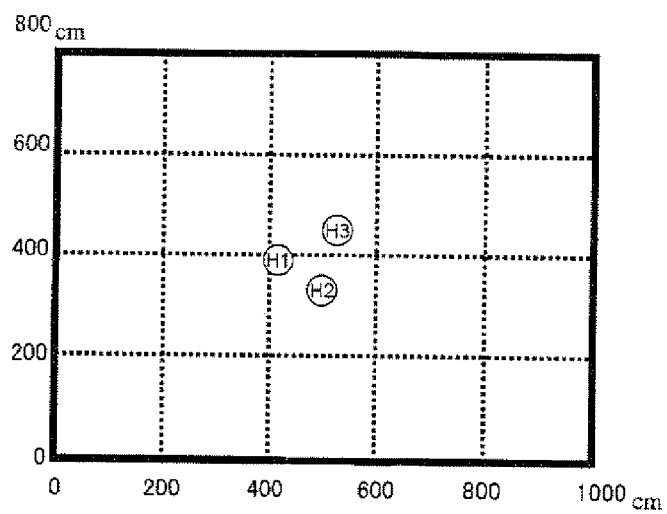
FIG. 11F is a drawing that shows an example of an estimated position (position after the application of the observation value) of the person at the time of 2008/09/02__12:00:02 in the room that is an observation object of the object position estimation system in accordance with the first embodiment of the present invention.

FIG. 11B shows estimated positions of persons, estimated based upon person information detected by the tag reader 304 and the camera 305 at time 2008/09/02__12:00:00. Moreover, FIG. 11C shows the initial positions of estimated positions at time 2008/09/02__12:00:01. FIG. 11D shows estimated positions of persons, estimated by also using person information detected by the tag reader 304 and the camera 305 at time 2008/09/02__12:00:01. Moreover, FIG. 11E shows the initial positions of estimated positions at time 2008/09/02__12:00:02. FIG. 11F shows estimated positions of persons, estimated by also using person information detected by the tag reader 304 and the camera 305 at time 2008/09/02__12:00:02.

<Explanation of Operations of the Present System>

Figure 16:
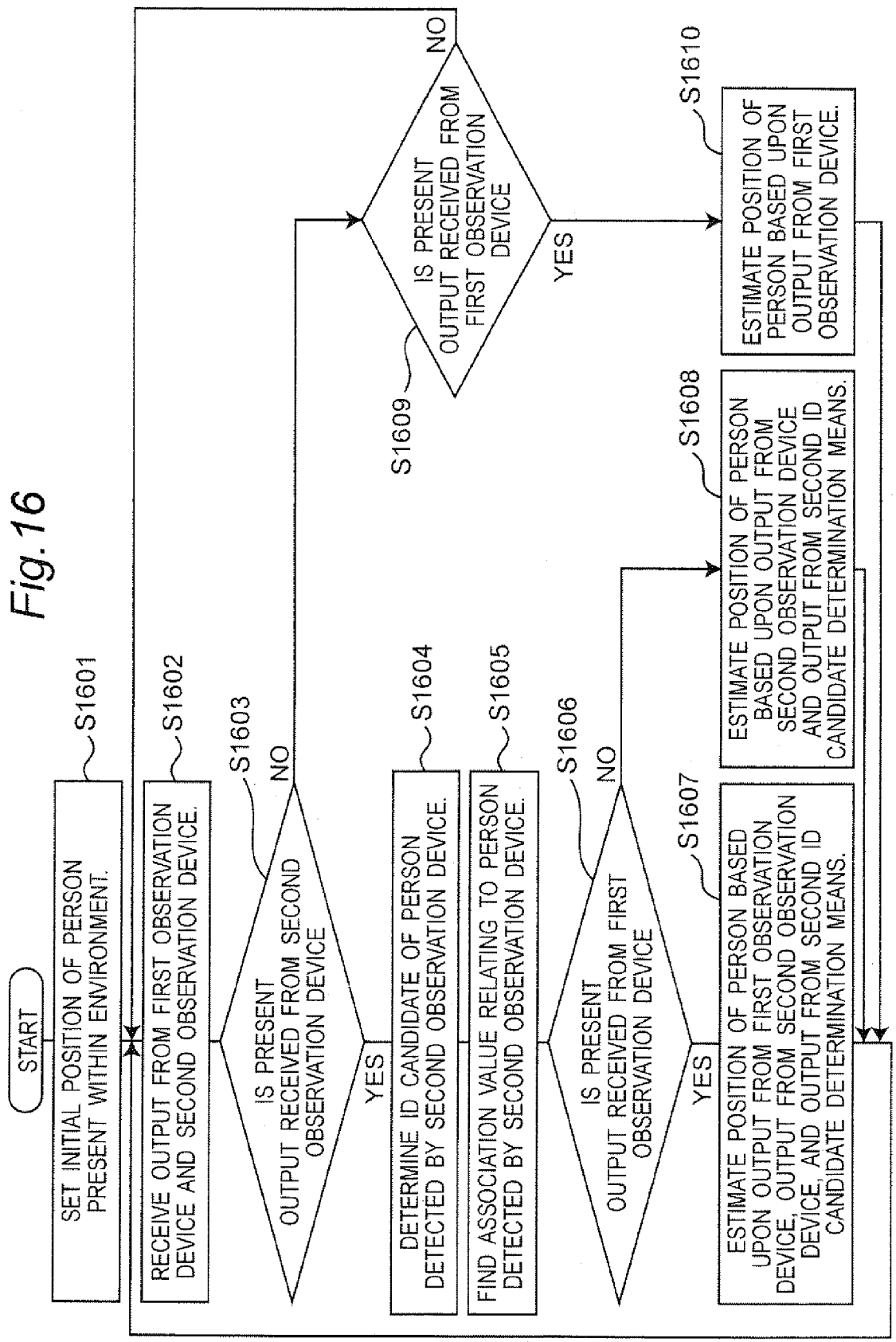
FIG. 16 is a flow chart that shows processes of the object position estimation system in accordance with the first embodiment of the present invention.

Referring to a flow chart of FIG. 16, the following description will discuss the operations in detail along a time flow. Additionally, the following sequence of operations are carried out under operation control by the object position estimation device 120. Of the object position estimation system, the second object ID likelihood determination means 107, the object position estimation means 108, and the association means 109 are supposed to form the object position estimation device 120. Moreover, the object position estimation system is explained as being composed of the object position estimation device 120, the first observation device 101 having the tag reader 304, and the second observation device 102 having the camera 305. The tag reader 304 is one example of the first detection unit 101a, and the camera 305 is one example of the second detection unit 102a.

Upon activation of the object position estimation system of the first embodiment of the present invention, in step S1601, first the initial position is set to an estimated position of a person 302 by the object position estimation means 108 (see FIG. 11A). Additionally, the object position estimation system of the first embodiment is supposed to have a counter for use in confirming how many times the object positions are updated in the object position estimation means 108. When this counter is 0, that is, upon the actuation of the object position estimation system in which no update of the object position has been executed, the position of a person 302 is set to the initial position. In this case, it is supposed that a gate-type tag reader 304d, which functions as a tag reader of the first observation device 101, is installed at an entrance 301D of the room 301 indicated by a chain line in FIG. 3. Moreover, when the persons 302 enter the room 301 through the entrance 301D, the tags of all the persons 302 entered the room 301 can be read by the gate-type tag reader 304d. For this reason, all the IDs of the persons 302 who are present in the room 301 are supposed to be confirmed by the first observation device 101. Moreover, the IDs of the persons 302 who are present in the room 301 may be recorded, for example, in the first inner storage unit 110 or the like of the first observation device 101 of the object position estimation system. In the case when no gate-type tag reader can be installed due to an environmental reason, the initial positions of the persons 302 may be set to initial positions obtained when the persons 302 have been first detected by the tag reader 304.

Next, in step S1602, the object position estimation device 120 is allowed to receive outputs, that is, pieces of observation information, from the first observation device 101 and the second observation device 102. In this case, for example, suppose that, at time 2008/09/02__12:00:00, the object position estimation device 120 received observation information including persons 302 who were first detected by the tag reader 304, the camera 305, and the image processing unit 102b (see FIG. 10A with respect to the detection states, and see FIGS. 5 and 6 with respect to the positional coordinates detected). The pieces of information detected by the tag reader 304 and the camera 305 are outputted to the object position estimation device 120. In this example, an explanation is given by exemplifying a state in which both of the observation times of the tag reader 304 and the camera 305 are set to 2008/09/02__12:00:00; however, actually the observation times might have a deviation. In such a case, for example, by setting reference times with one-second intervals, and the system may determine all the observation values obtained within a permissible range from the reference time, for example, within a range of ±500 msec, as the observation values obtained at the same time. FIG. 18 shows one example of the setting of the reference times. In the observation state of FIG. 18, the observations are carried out within a range of ±500 msec from 12:00:01:000 that corresponds to the reference time so that OBS_CAM_201 and OBS_TAG_201 are determined by the system as being observed at the same time. In the same manner, OBS_CAM_202 and OBS_TAG_202, OBS_CAM_203 and OBS_TAG_203 are determined respectively by the system as being observed at the same time.

Next, in step S1603, pieces of person detection information (OBS_CAM_001, OBS_CAM_002, OBS_CAM_003), detected by the camera 305 and the image processing unit 102b of the second detection unit 102a of the second observation device 102, contain no second ID likelihood required for the process of the object position estimation means 108. For this reason, first, the person detection information is outputted to the second object ID likelihood determination means 107 from the second observation device 102, and in the second object ID likelihood determination means 107, the second ID likelihood of the person 302 detected in the second observation device 102 is determined. In this case, in step S1603, it is determined whether or not the person detection information has been outputted from the second observation device 102 to the second object ID likelihood determination means 107. In the case when the person detection information has been outputted from the second observation device 102 to the second object ID likelihood determination means 107, the sequence proceeds to step S1604. In contrast, in the case when the person detection information is not outputted from the second observation device 102 to the second object ID likelihood determination means 107, the sequence proceeds step S1609. In this example, since the camera 305 outputs the person detection information, the sequence proceeds to the direction of YES in step S1603, thereby proceeding to step S1604. In contrast, when no person detection information is outputted from the camera 305, for example, when the person 302 enters the blind spot of the camera 305, the sequence proceeds to the direction of NO in step S1603, thereby proceeding to step S1609.

In step S1604, the second ID likelihood of the person detected by the second observation device 102 is determined by the second object ID likelihood determination means 107. That is, based upon the output from the object tracking state determination means 106 of the second observation device 102 to the second object ID likelihood determination means 107, the second object ID likelihood determination means 107 determines that pieces of information of OBS_CAM_001, OBS_CAM_002, and OBS_CAM_003 are person detection information obtained by detecting new persons. The reason for this is because, as described earlier, when no information obtained by detecting those persons exists within a certain period of time prior to those pieces of information, the second object ID likelihood determination means 107 is allowed to make such a determination. Moreover, the second object ID likelihood determination means 107 evenly assign the probability of being persons present in the room 301 to the second ID likelihood of each of the persons detected as OBS_CAM_001, OBS_CAM_002, and OBS_CAM_003. That is, by the second object ID likelihood determination means 107, the person detected as OBS_CAM_001 is set to have a probability of 1/3 of being a person 302A, a probability of 1/3 of being a person 302B, and a probability of 1/3 of being a person 302C. With respect to OBS_CAM_002 and OBS_CAM_003, the probability is assigned in the same manner by the second object ID likelihood determination means 107.

Next, in step S1605, the association means 109 finds an association value based upon the person position detected by the camera 305, the second ID likelihood of the person outputted by the second object likelihood determination means 107, and the person's ID and person position estimated by the object position estimation means 108 shown in FIG. 11A. The association value thus found is recorded in the association value data base 109a (see FIG. 8).

Next, in step S1606, person detection information, detected by the tag reader 304 of the first detection unit 101a of the first observation device 101, is directly outputted to the object position estimation means 108 from the first observation device 101. This is because the person detection information contains the first ID likelihood and the first position likelihood required for the process in the object position estimation means 108. In this case, when the person detection information has been outputted from the first observation device 101 to the object position estimation means 108, the sequence proceeds to step 1607. In contrast, when the person detection information is not outputted from the first observation device 101 to the object position estimation means 108, the sequence proceeds to step S1608. In this example, since the tag reader 304 outputs the person detection information, the sequence proceeds to the direction of YES in step S1606, thereby proceeding to step S1607. In contrast, when no person detection information is outputted from the tag reader 304, for example, when the person 302 enters the blind spot of the tag reader 304, the sequence proceeds to the direction of NO in step S1606, thereby proceeding to step S1608.

Moreover, in step S1609, person detection information, detected by the tag reader 304 of the first detection unit 101a of the first observation device 101, is directly outputted to the object position estimation means 108 from the first observation device 101. This is because the person detection information contains the first ID likelihood and the first position likelihood required for the process in the object position estimation means 108. In this case, in step S1609, it is determined whether or not person detection information containing the first ID likelihood and the first position likelihood is outputted from the first observation device 101 to the object position estimation means 108. When the person detection information has been outputted from the first observation device 101 to the object position estimation means 108, the sequence proceeds to step 1610. In contrast, when the person detection information is not outputted from the first observation device 101 to the object position estimation means 108, the sequence returns to step S1602. In this example, since the tag reader 304 outputs the person detection information, the sequence proceeds to the direction of YES in step S1609, thereby proceeding to step S1610. In contrast, when no person detection information is outputted from the tag reader 304, for example, when the person 302 enters the blind spot of the tag reader 304, the sequence proceeds to the direction of NO in step S1609, thereby returning to step S1602.

In step S1607, based upon the first ID likelihood and the first position likelihood of the person detected by the tag reader 304 of the first detection unit 101a of the first observation device 101, the second position likelihood of the person detected by the camera 305 of the second detection unit 102a of the second observation device 102, and the second ID likelihood of the person outputted by the second object ID likelihood determination means 107, the object position estimation means 108 estimates the position of the person. Based upon this position estimation, the person's ID and the position of the person are updated (see FIG. 11B updated from FIG. 11A). In this example, since both of the tag reader 304 and the camera 305 output person detection information, the process of step S1607 is carried out. Thereafter, the sequence returns to step S1602.

Moreover, in step S1608, based upon the second position likelihood of the person detected by the camera 305 of the second detection unit 102a of the second observation device 102 and the second ID likelihood of the person outputted by the second object ID likelihood determination means 107, the object position estimation means 108 estimates the position of the person. Moreover, based upon this position estimation, the person's ID and the position of the person are updated (see FIG. 11B updated from FIG. 11A). Thereafter, the sequence returns to step S1602.

Moreover, in step S1610, based upon the first ID likelihood and the first position likelihood of the person detected by the tag reader 304 of the first detection unit 101a of the first observation device 101, the object position estimation means 108 estimates the position of the person. Based upon this position estimation, the person's ID and the position of the person are updated (see FIG. 11B updated from FIG. 11A). Thereafter, the sequence returns to step S1602.

Moreover, in step S1602 returned thereto from step S1607, or step S1608, or step S1610, a person 302 is detected by the tag reader 304 and the camera 305 at the next time 2008/09/02_12:00:01 (see FIG. 10B with respect to the detected state, and see FIGS. 5 and 6 with respect to the detected positional coordinates).

Next, in step S1603, it is determined whether or not the person detection information is outputted from the second observation device 102 to the second object ID likelihood determination means 107. When the person detection information has been outputted from the second observation device 102 to the second object ID likelihood determination means 107, the sequence proceeds to step S1604. In contrast, when the person detection information is not outputted from the second observation device 102 to the second object ID likelihood determination means 107, the sequence proceeds to step S1609.

Next, in step S1604, the second object ID likelihood determination means 107 determines the second ID likelihood of each of the persons detected by the second observation device 102. That is, in the same manner as in time 2008/09/02_12:00:00, the second ID likelihood determination means 107 needs to determine the second ID likelihood of each of the persons detected as OBS_CAM_004, OBS_CAM_005, and OBS_CAM_006, at time 2008/09/02_12:00:01. In this case, however, suppose that the object tracking state determination means 106 has determined that OBS_CAM_004 corresponds to person detection information obtained by tracking OBS_CAM_001 because of sameness of the amount of color feature given by the output of the object tracking state determination means 106. Moreover, in the same manner, suppose that the object tracking state determination means 106 has determined that OBS_CAM_005 corresponds to person detection information obtained by tracking OBS_CAM_002 and that OBS_CAM_006 corresponds to person detection information obtained by tracking OBS_CAM_003. Then, based upon the determined information by the object tracking state determination means 106, the second object ID likelihood determination means 107 outputs the association value of OBS_CAM_001 recorded in the association value data base 109a as the second ID likelihood of the person of OBS_CAM_004. With respect to OBS_CAM_005 and OBS_CAM_006, the second object ID likelihood determination means 107 gives outputs in the same manner.

In the case when an observation value OBS_CAM_004 is obtained by an observation at this time, a set of two observation IDs of observation ID=OBS_CAM_004 and observation ID=OBS_CAM_001 is outputted from the object tracking state determination means 106 to the second object ID likelihood determination means 107. When the second object ID likelihood determination means 107 receives the set of observation IDs from the object tracking state determination means 106, the second object ID likelihood determination means 107 reads the association value of observation ID=OBS_CAM_001 from the association value data base 109a so as to find the ID likelihood of observation ID=OBS_CAM_004. In this case, a method is required so as to distinguish the observation ID to be used for finding the ID likelihood and the observation ID to be used for reading the association value. As this method, for example, an observation value whose association value is recorded in the association value data base 109a is determined as the observation value for which its association value needs to be read.

Next, in step S1605, step S1606, and step S1609, the same processes as explained earlier are carried out.

In step S1607, based upon the first ID likelihood and the first position likelihood of the person detected by the tag reader 304 of the first detection unit 101a of the first observation device 101, the second position likelihood of the person detected by the camera 305 of the second detection unit 102a of the second observation device 102, and the second ID likelihood outputted from the second object ID likelihood determination means 107, the object position estimation means 108 estimates the position of the person. Moreover, based upon this position estimation, the ID of the person and the position of the person are updated (see FIG. 11D updated from FIG. 11C). Thereafter, the sequence returns to step S1602.

Moreover, in step S1608, based upon the second position likelihood of the person detected by the camera 305 of the second detection unit 102a of the second observation device 102 and the second ID likelihood of the person outputted from the second object ID likelihood determination means 107, the object position estimation means 108 estimates the position of the person. Based upon this position estimation, the ID of the person and the position of the person are updated (see FIG. 11D updated from FIG. 11C). Thereafter, the sequence returns to step S1602.

Furthermore, in step S1610, based upon the first ID likelihood and the first position likelihood of the person detected by the tag reader 304 of the first detection unit 101a of the first observation device 101, the object position estimation means 108 estimates the position of the person. Based upon this position estimation, the ID of the person and the position of the person are updated (see FIG. 11D updated from FIG. 11C). Thereafter, the sequence returns to step S1602.

Then, at time 2008/09/02_12:00:02 and thereafter, the same processes are carried out, and the ID of the person and the position of the person are updated (see FIG. 11F updated from FIG. 11E).

In this embodiment, an explanation has been given by exemplifying an indoor space, that is, the room 301; however, the present system may be utilized even in an outdoor space, as long as persons to be managed are allowed to carry tags. For example, a gate-type tag reader is attached to a school gate or a staircase located between a schoolhouse and a ground so that those students present in the schoolhouse and those present in the ground can be identified. Moreover, by attaching a tag reader and a camera to a barrier of a ground or a schoolhouse, it is possible to estimate which positions in the ground students are present. In the case when the ground has a large area to cause difficulty in observing all the ground by using a single tag reader and a single camera, the number of the tag readers and cameras may be increased.

With the above-mentioned structure, in the case when the second observation device 102 is successfully tracking the object, the association value obtained at the time of the previous detection of the object may replace the second ID likelihood of the object detected by the second detection unit 102a and the image processing unit 102b of the second observation device 102 at this time. Thus, the corresponding processes of the object position estimation means 108 can be carried out.

Second Embodiment

The following description will discuss the estimating state of the object position estimation means 108. Since positions of persons shown in FIG. 11A are randomly set in their initial values, those positions are completely different from actual positions at which the persons are present (FIG. 9A). FIG. 11B shows the results of object position estimations carried out based upon information of the person detected by the first observation device 101 and the second observation device 102 at time 2008/09/02_12:00:00. Although the estimated positions are made closer to the actual positions where the persons are present (FIG. 9A), there are still positional errors about 2 m. This is because the positions of the persons are updated based upon the initial positions of the persons. That is, immediately after the activation of the object position estimation system, the estimation precision of the object positions is low. Accordingly, the precision of the association value of the association means 109 that utilizes the results of object position estimations of the object position estimation means 108 is also lowered.

Therefore, based upon the object IDs and positions of the objects detected by the first detection unit 101a of the first observation device 101, the association means 109 may find the association values relating to the objects detected by the second detection unit 102a and the image processing unit 102b of the second observation device 102. The following description will exemplify a structure in which the tag reader 304 is used as the first detection unit 101a of the first observation device 101. As described above, the position detecting precision of the tag reader 304 is low. For this reason, the association means 109 may change pieces of information to be used for calculating the association value between the time before the convergence of the object position estimation results of the object position estimation means 108 and the time after the convergence thereof. More specifically, up to the convergence of the object position estimation results of the object position estimation means 108, the association values relating to the objects detected by the second detection unit 102a and the image processing unit 102b of the second observation device 102 are found, based upon the object IDs and the positions of the objects detected by the tag reader 304. In contrast, after the convergence of the object position estimation results of the object position estimation means 108, the association values relating to the objects detected by the second detection unit 102a and the image processing unit 102b of the second observation device 102 may be found based upon the results of the object position estimation.

The following description will discuss one example as to how to determine the convergence of the object position by the association means 109. In the case when, for example, the above-mentioned Kalman filter is used as the updating method of the object position, the estimated position of the object is outputted as a Gaussian distribution represented by average and dispersion. In this case, at the time when the association means 109 has determined that the average dispersion of all the objects becomes less than a threshold value, the association means 109 may determine that the object positions have been converged. Moreover, the converging state of the object positions (for example, information indicating that the object positions are converged after observations of N-number of times since the activation (for example, N is an integer exceeding 1)) may be preliminarily confirmed by the association means 109 by preliminary experiments, and the association means 109 is allowed to determine that the object positions are not converged up to the observations of N-number of times from the activation of the object position estimation system. In this case, the object position estimation means 108 is supposed to have a counter used for confirming how many times the object positions are updated.

By using the above-mentioned arrangement, immediately after the activation of the object position estimation system of the present invention, the association means 109 can find the association value by using output information of the first observation device 101. With this arrangement, it becomes possible to calculate the association value more accurately, that is, the second ID likelihood more accurately.

Additionally, in the respective embodiments, the respective portions of the first detection unit 101a functioning as the first observation unit, the first object position likelihood determination means 103, the first object ID likelihood determination means 104, the second detection unit 102a functioning as the second observation unit, the second object position likelihood determination means 105, the object tracking state determination means 106, the second object ID likelihood determination means 107, the association means 109, and the object position estimation means 108, or desired portions thereof may be configured by pieces of software. Thus, a computer program having steps forming controlling operations of the respective embodiments of the specification of the present invention is prepared so that the program is readably stored in a recording medium, such as a storage device (hard disk or the like), and by allowing a computer to read the computer program and store it in a temporary storage device (semiconductor memory, or the like) and to execute by using the CPU, the respective functions or steps can be executed.

By properly combining the arbitrary embodiments of the aforementioned various embodiments, the effects possessed by the embodiments can be produced.

INDUSTRIAL APPLICABILITY

The object position estimation system, object position estimation device, object position estimation method, and object position estimation program in accordance with the present invention make it possible to estimate positions of objects even when an observation device having no ID identifying function for the objects is included. Monitoring camera systems or the like have been widely introduced; however, in most of these systems, images in the monitoring region are stored and identifying processes of the subject images are generally carried out by manually viewing processes. Since the present invention makes it possible to identify persons and their positions without the need of manual operations, the positions and moving lines of persons can be automatically obtained and managed so that an effective managing system for persons, which has features that have not achieved conventionally, can be achieved and effectively applied for security purpose. Moreover, the present invention is also applicable to a system or the like that manages positions of articles, such as containers, in the physical distribution field of the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An object position estimation system, which estimates a position of an object, comprising:
   a first observation unit that acquires pieces of first observation information including positions and identifications of the object at respectively different points of time;
   a first object position likelihood determination unit that, based upon the first observation information, determines first object position likelihoods corresponding to estimated positions of the object at the respectively different points of time;
   a first object identification likelihood determination unit that, based upon the identifications, determines first object identification likelihoods of the object at the respective points of time;
   a second observation unit that attaches second observation identifications to pieces of second observation information including the positions and amounts of feature of the object acquired at respectively different points of time;
   a second object position likelihood determination unit that, based upon the second observation information, determines second object position likelihoods corresponding to estimated positions of the object at the respective points of time;
   an object tracking state determination unit that determines, by making the second observation identifications of two pieces of the second observation information having a same amount of feature of the object, observed at different points of time, mutually associated with each other, tracking state information of the object;
   a second object identification likelihood determination unit that, based upon the tracking state information of the object and the estimated positions of the object, determines second object identification likelihoods of the second observation information;
   an association unit that, based upon the first object identification likelihoods and the first object position likelihoods of the object, calculates a first object association value, and based upon the second object identification likelihoods and the second object position likelihoods, calculates a second object association value; and
   an object position estimation unit that, based upon at least one of two groups, (1) the first object identification likelihoods, the first object position likelihoods, and the first object association value of the object, and (2) the second object identification likelihoods, the second object position likelihoods, and the second object association value of the object, estimates the position of the object.

2. The object position estimation system according to claim 1, wherein the object tracking state determination unit outputs a tracking success likelihood that indicates a probability of successful tracking of the object and a tracking failure likelihood that indicates a probability of failure in tracking the object, and
   the second object identification likelihood determination unit provides a sum of a value obtained by multiplying the association value calculated upon a previous detection of the object by the tracking success likelihood and a value obtained by dividing the tracking failure likelihood by a number of all the objects serving as detection subjects, as the second identification likelihood of the object.

3. The object position estimation system according to claim 1, wherein in a case when by detecting two pieces of the second observation information having a same amount of feature, obtained at different points of time, the object tracking state determination unit determines that the object detected by the second observation device is being tracked, the association unit finds the identification of the object detected by the second observation device, based upon the identification of the object and the position of the object estimated by the object position estimation unit.

4. The object position estimation system according to claim 1, further comprising:
   an environment map in which entrance information including a position of an entrance through which the persons that are present in the environment get in or get out, or blind spot information of the first observation device, or blind spot information of the second observation device is recorded.

5. The object position estimation system according to claim 1, wherein the object tracking state determination unit determines probability of detecting a plurality of overlapped objects as a single object.

6. An object position estimation method, which estimates a position of an object, comprising:
   acquiring pieces of first observation information including positions and identifications of the object at respectively different points of time by a first observation unit;
   based upon the first observation information, determining first object position likelihoods corresponding to estimated positions of the object at the respectively different points of time by a first object position likelihood determination unit;
   based upon the identifications, determining first object identification likelihoods of the object at the respective points of time by a first object identification likelihood determination unit;
   attaching second observation identifications to pieces of second observation information including the positions and amounts of feature of the object acquired at respectively different points of time, by a second observation unit;
   based upon the second observation information, determining second object position likelihoods corresponding to estimated positions of the object at the respective points of time by a second object position likelihood determination unit;
   by making the second observation identifications of two pieces of the second observation information having a same amount of feature of the object, observed at different points of time, mutually associated with each other, determining tracking state information of the object by an object tracking state determination unit;
   based upon the tracking state information of the object and the estimated positions of the object, determining second object identification likelihoods of the second observation information by a second object identification likelihood determination unit;
   based upon the first object identification likelihoods and the first object position likelihoods of the object, calculating a first object association value by an association unit;
   based upon the second object identification likelihoods and the second object position likelihoods of the object, calculating a second object association value by the association unit; and
   based upon at least one of two groups, (1) the first object identification likelihoods, the first object position likelihoods, and the first object association value of the object, and (2) the second object identification likelihoods, the second object position likelihoods, and the second object association value of the object, estimating the position of the object by an object position estimation unit.

7. A non-transitory computer readable medium containing computer instructions stored therein for causing a computer processor to perform:
   acquiring first observation information including positions and identifications of an object at respectively different points of time by a first observation unit;
   based upon the first observation information, determining first object position likelihoods corresponding to estimated positions of the object at the respectively different points of time by a first object position likelihood determination unit;
   based upon the identifications, determining first object identification likelihoods of the object at the respective points of time by a first object identification likelihood determination unit;
   attaching second observation identifications to pieces of second observation information including the positions and amounts of feature of the object acquired at respectively different points of time, by the second observation unit;
   based upon the second observation information, determining second object position likelihoods corresponding to estimated positions of the object at the respective points of time by a second object position likelihood determination unit;
   by making second observation identifications of two pieces of the second observation information having a same amount of feature of the object, observed at different points of time, mutually associated with each other, determining tracking state information of the object by an object tracking state determination unit;
   based upon the tracking state information of the object and the estimated positions of the object, determining second object identification likelihoods of the second observation information by a second object identification likelihood determination unit;
   based upon the first object identification likelihoods and the first object position likelihoods of the object, calculating a first object association value by an association unit;
   based upon the second object identification likelihoods and the second object position likelihoods, calculating a second object association value by the association unit; and
   based upon at least one of two groups, (1) the first object identification likelihoods, the first object position likelihoods, and the first object association value of the object, and (2) the second object identification likelihoods, the second object position likelihoods, and the second object association value of the object, estimating the position of the object by using an object position estimating unit.

8. An object position estimation device comprising:
   a first object position likelihood determination unit that, based upon first observation information including positions and identifications of an object at respectively different points of time, from a first observation unit that acquires the first observation information, determines first object position likelihoods corresponding to estimated positions of the object at the respectively different points of time;
   a first object identification likelihood determination unit that, based upon the identifications, determines first object identification likelihoods of the object at the respective points of time;
   a second object position likelihood determination unit that, based upon second observation information including positions and amounts of feature of an object acquired at respectively different points of time, from a second observation unit that attaches second observation identifications to piece of the second observation information, determines second object position likelihoods corresponding to estimated positions of the object at the respectively different points of time;
   an object tracking state determination unit that by making the second observation identifications of two pieces of the second observation information having a same amount of feature of the object, observed at different points of time, mutually associated with each other, determines tracking state information of the object;
   a second object identification likelihood determination unit that, based upon the tracking state information of the object and the estimated positions of the object, determines second object identification likelihoods of the second observation information;
   an association unit that, based upon the first object identification likelihoods and the first object position likelihoods of the object, calculates a first object association value, and based upon the second object identification likelihoods and the second object position likelihoods, calculates a second object association value; and
   an object position estimation unit that, based upon at least either one of the groups including (1) the first object identification likelihoods, the first object position likelihoods, and the first object association value of the object, and (2) the second object identification likelihoods, the second object position likelihoods, and the second object association value of the object, estimates the position of the object.

* * * * *